United States Patent
Kitamura et al.

(10) Patent No.: US 7,740,695 B2
(45) Date of Patent: Jun. 22, 2010

(54) INK SET, INK CARTRIDGE, INKJET RECORDING METHOD, AND RECORDED MATTER

(75) Inventors: Kazuhiko Kitamura, Matsumoto (JP); Akihito Sao, Matsumoto (JP); Hiroshi Fukumoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 466 days.

(21) Appl. No.: 11/906,067

(22) Filed: Sep. 28, 2007

(65) Prior Publication Data

US 2009/0000511 A1 Jan. 1, 2009

(30) Foreign Application Priority Data

Sep. 29, 2006 (JP) .............................. 2006-266416

(51) Int. Cl.
*C09D 11/02* (2006.01)

(52) U.S. Cl. .............. 106/31.47; 106/31.48; 106/31.49; 106/31.5; 106/31.52

(58) Field of Classification Search .............. 106/31.47, 106/31.48, 31.49, 31.5, 31.52; 347/100
See application file for complete search history.

(56) References Cited

U.S. PATENT DOCUMENTS

| | | | |
|---|---|---|---|
| 6,852,154 B2 * | 2/2005 | Kitamura et al. ......... | 106/31.47 |
| 6,929,361 B2 * | 8/2005 | Matsumoto et al. ....... | 106/31.47 |
| 6,984,032 B2 * | 1/2006 | Kitamura et al. ......... | 106/31.47 |
| 7,211,132 B2 * | 5/2007 | Oki et al. .................. | 106/31.47 |
| 7,276,111 B2 * | 10/2007 | Oki et al. .................. | 106/31.49 |
| 7,303,272 B2 * | 12/2007 | Taguchi et al. ............... | 347/100 |
| 7,323,045 B2 | 1/2008 | Hanmura et al. | |
| 7,416,592 B2 * | 8/2008 | Kitamura et al. ......... | 106/31.47 |
| 7,465,346 B2 * | 12/2008 | Fukumoto et al. ........ | 106/31.48 |
| 7,465,347 B2 * | 12/2008 | Kitamura et al. ......... | 106/31.48 |
| 7,553,357 B2 * | 6/2009 | Sao et al. .................. | 106/31.43 |
| 7,618,484 B2 * | 11/2009 | Fujimoto et al. ......... | 106/31.47 |
| 2006/0016368 A1 | 1/2006 | Ozawa et al. | |
| 2007/0266890 A1 * | 11/2007 | Taguchi et al. ........... | 106/31.47 |
| 2008/0047461 A1 | 2/2008 | Hanmura et al. | |
| 2008/0199615 A1 | 8/2008 | Harada et al. | |
| 2008/0274283 A1 | 11/2008 | Tateishi et al. | |
| 2009/0285988 A1 * | 11/2009 | Matsumoto et al. ...... | 106/31.47 |

FOREIGN PATENT DOCUMENTS

| | | |
|---|---|---|
| EP | 1 840 171 | 10/2007 |
| JP | 2000-290559 | 10/2000 |
| JP | 2001-288392 | 10/2001 |
| JP | 2002-371214 | 12/2002 |
| JP | 2005-105135 | 4/2005 |
| JP | 2005-105136 | 4/2005 |
| JP | 2005-264091 | 9/2005 |
| JP | 2005-336376 | 12/2005 |
| JP | 2006-057076 | 3/2006 |
| WO | 02/060994 | 8/2002 |
| WO | 2006/075706 | 7/2006 |
| WO | 2006/082669 | 10/2006 |

OTHER PUBLICATIONS

Patent Abstracts of Japan and JPO computer English translation of JP 2005-264091 dated Sep. 29, 2005.
Patent Abstracts of Japan of 2000-290559 dated Oct. 17, 2000.
Patent Abstracts of Japan of 2001-288392 dated Oct. 16, 2001.
Patent Abstracts of Japan of 2002-371214 dated Dec. 26, 2002.
Patent Abstract of Japan of 2005-105135 dated Apr. 21, 2005.

\* cited by examiner

*Primary Examiner*—Helene Klemanski
(74) *Attorney, Agent, or Firm*—Ladas and Parry LLP

(57) ABSTRACT

An ink set containing at least a yellow ink composition, a magenta ink composition, and a cyan ink composition:
said magenta ink composition containing as a colorant at least one type of compound expressed by the formula M-1 in claim 1, and at least one type of compound expressed by the following formula M-2 in claim 1,
the yellow ink composition containing as a colorant at least one type of compound expressed by the formula Y-1 in claim 1; and
the cyan ink composition containing as a colorant at least one type of compound selected from the group consisting of compounds or salts thereof expressed by the Formula C-1 in claim 1.

24 Claims, No Drawings

INK SET, INK CARTRIDGE, INKJET RECORDING METHOD, AND RECORDED MATTER

BACKGROUND

1. Technical Field

The present invention relates to an ink set, particularly to an ink set that can form an image with excellent ozonefastness, lightfastness and moisturefastness, as well as to an ink cartridge, inkjet recording method, and recorded matter that use this ink set.

2. Related Art

In recent years attention has focused on the inkjet recording method. The inkjet recording method is a printing method where printing is performed by spraying an ink composition as small droplets, and these small droplets adhere to a recording medium such as paper or the like. This method has the characteristics of enabling high-speed printing of a high-resolution high quality image using a relatively inexpensive device. Furthermore, inkjet recording devices that use this method have wide acceptance in the market because of the excellent printing quality, low cost, relatively quiet operation, and excellent graphics capability. Of these devices, thermal (bubblejet (registered trademark)) and piezoelectric drop on demand printers have been especially commercially successful, and are widely used as printers for personal computers at the office and home.

Furthermore, in recent years, printed matter has been obtained by forming a color image using an inkjet recording method that uses a plurality of color ink compositions. Generally, formation of a color image is performed using three colors, namely a yellow ink composition, a magenta ink composition, and a cyan ink composition, or if desired, using four colors by adding a black ink composition. Furthermore, color images are also formed using six colors with the addition of a light cyan ink composition and a light magenta ink composition to the aforementioned four colors, or using seven colors by also adding a dark yellow ink composition. Combinations of two or more of these ink compositions are referred to as an ink set.

The ink compositions which are used in forming the aforementioned color image are required to have good coloring properties for the individual color of each ink composition, as well as the capability to create favorable intermediate colors when a plurality of ink compositions are combined, and the recorded matter obtained thereby must not discolor when stored.

Furthermore, in recent years continuous improvements have been made in the head, in the composition, recording method, and media in order to achieve "picture quality" printing using a color inkjet printer, and the image quality obtained is similar to a photograph and at a level indistinguishable from a "silver chloride photograph". On the other hand, efforts are underway to improve the storage properties of the images of recorded matter obtained using a color inkjet printer by improving the ink compositions and the media, and in particular the lightfastness of the image has been improved to a practical level (for example, refer to JP-A-2000-290559 and JP-A-2001-288392). However, degradation of the image occurs not only because of the effect of light, but also because of oxidation due to oxidative gases existing in the environment such as ozone, and water (humidity) in the environment, and therefore discoloration and fading of the image will proceed. Therefore, in order to further improve the storage properties of the image of the recorded matter, the ozonefastness and humidityfastness should also be improved along with improving the lightfastness of the image formed by the ink composition. Therefore, various investigations have been performed in order to improve the lightfastness, ozonefastness, and humidityfastness of the inkjet recorded matter, but in particular, efforts to date have been made to improve the ozonefastness of the colorants used in the ink composition (refer to International Patent WO02/060994 and JP-A-2002-371214).

Furthermore, in an ink set, if the lightfastness, ozonefastness, and humidityfastness of a specific ink composition are noticeably inferior to the lightfastness, ozonefastness, and humidityfastness of the other ink compositions, the color formed by that specific ink composition will fade and discolor faster than the other colors, so the color balance of the entire image will be poor, and an observer will be aware of the degradation in the picture quality of the image in a shorter period of time than they could be aware of fading of an image formed by only one ink composition. Therefore, with an ink set, in addition to improving the lightfastness, ozonefastness, and humidityfastness of each of the ink compositions which form the ink set, preferably the level of the lightfastness, ozonefastness, and humidityfastness of each of the ink compositions, or in other words the degradation speeds and the fading speeds of an image formed by each of the ink compositions due to light, ozone, and water will preferably be as similar as possible. In other words, the lightfastness, ozonefastness, and humidityfastness of each of the ink compositions that make up the ink set should be excellent, and preferably the difference in the lightfastness, ozonefastness, and humidityfastness of each ink composition will be small.

Furthermore, images with varying color intensities can be formed and an image without a grainy feel can be obtained by using an inkjet that includes two different tints of ink compositions with different color concentrations in the same color system. An ink set that includes two types of ink compositions with different color concentrations in this manner is used primarily for printing photograph images, but when forming the photographic image, generally an ink composition with a low color concentration is usually used in order to relieve or eliminate the graininess of the image. Furthermore, when evaluating the lightfastness, ozonefastness, and humidityfastness, a pattern with an optical concentration near 1.0 is formed as an evaluation sample using ink compositions with low color concentration. Therefore, in order to improve the lightfastness, ozonefastness, and humidityfastness of the overall ink set and the lightfastness, ozonefastness, and humidityfastness of recorded matter with photographic images, improving the lightfastness, ozonefastness, and humidityfastness of the ink compositions with low color concentration is critical. On the other hand, ink compositions with rich color concentrations are used for printing extremely vivid images and graphic art patterns, so improving the lightfastness, ozonefastness, and humidityfastness of these ink compositions is also important.

Furthermore, a black ink composition plays an important role from the viewpoint of achieving image contrast in the image, and therefore black ink compositions are commonly included in an ink set. Therefore, when a black ink composition is included in the ink set, the black ink composition must have excellent lightfastness, ozonefastness, and humidityfastness, while at the same time the degradation speed of the black ink composition due to light, ozone, or water must not differ extremely from the degradation speed of the other ink compositions which make up the ink set.

As described above, in an ink set, each of the individual ink compositions that make up the ink set must have good lightfastness, ozonefastness, and humidityfastness, while at the same time the balance between the lightfastness, ozonefastness, and humidityfastness of the different ink compositions must be good, and when exposed to light, ozone, and water, a specific color must not fade and/or discolor faster than the other colors. Furthermore, a bronzing phenomenon may occur when attempting to improve the lightfastness, ozonefastness, and humidityfastness of each of the ink compositions which make up an ink set, and this bronzing phenomenon must also be reduced. Bronzing phenomenon refers to the phenomenon of floating red visible ink printed regions when printing is performed at high duty, and is thought to have a tendency to easily occur particularly when fill printing (printing to fill in an area at 100% duty) using an ink composition that uses a metal phthalocyanine based dye as the colorant. The bronzing phenomenon affects the color balance of the entire image, and can lead to poor image quality.

Furthermore, any ink set that improves the degradation of image quality or the like and that is capable of recording and image with good ozonefastness on a recording medium, as well as an ink cartridge that stores this ink set, a recording method that uses this ink set, and recorded matter that is recorded using this ink set has previously been proposed (for example, refer to JP-A-2005-105135).

While these ink sets or the like provide a practical level of lightfastness and ozonefastness for consumer applications, but there is demand for further improvement of lightfastness and ozonefastness for diversified applications and for versatility at the edge of inkjet technology. Furthermore, ensuring humidityfastness is an important characteristic for accommodating diversity of applications.

SUMMARY

The present invention was achieved in order to resolve the aforementioned problems, and relates to an ink set that is capable of forming an image with good lightfastness and moisturefastness on a recording medium, as well as to an ink cartridge that stores this ink set, a recording method that uses this ink set, and recorded matter that is recorded using this ink set.

The ink set of the present invention is an ink set comprising at least a yellow ink composition, a magenta ink composition, and a cyan ink composition:

the magenta ink composition containing as a colorant at least one type of compound expressed by the following formula M-1, and at least one type of compound expressed by the following formula M-2,

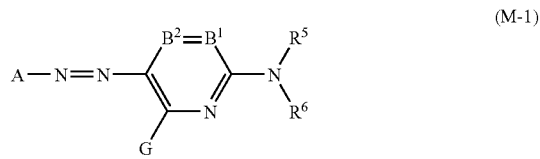

(M-1)

(in Formula M-1, A represents a residue of a five membered heterocyclic diazo component A-NH$_2$; B$^1$ and B$^2$ each represent —CR$^1$= or —CR$^2$=, or either one represents a nitrogen atom while the other represents either —CR$^1$= or —CR$^2$=; R$^5$ and R$^6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group; each group may also have a substitution group; G, R$^1$, and R$^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocycloxy group, an alkoxycarbonyloxy group, an aryloxycarbonyloxy group, an amino group substituted with an alkyl group, aryl group, or heterocyclic group, an acylamino group, a ureido group, a sulfamoylamino group, alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group, or a heterocyclothio group; each group may also have a substitution group; and furthermore, R$^1$ and R$^5$ or R$^5$ and R$^6$ bonded together can form a 5 or 6 membered ring)

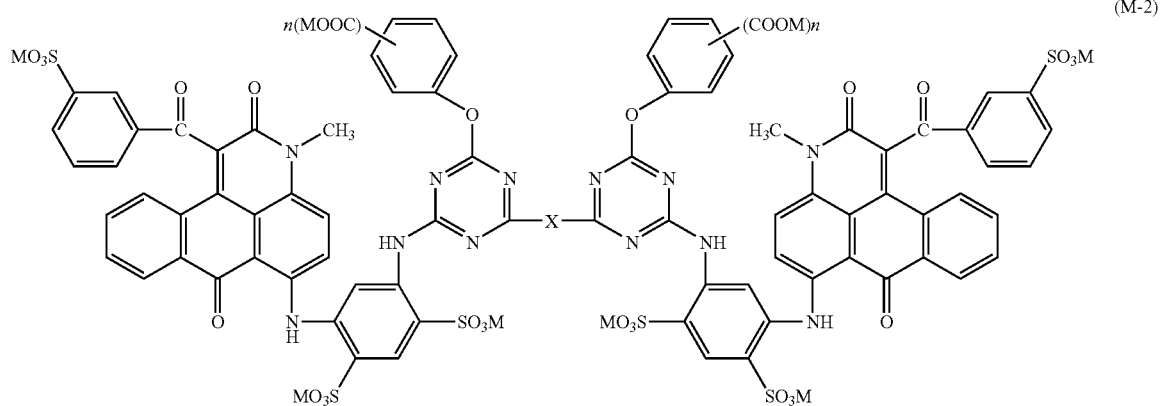

(M-2)

(in Formula M-2, M represents a hydrogen atom, ammonium group, or alkali metal atom, X represents a diaminoalkylene group, and n is either 1 or 2).

Furthermore, the yellow ink composition contains as a colorant at least one type of compound expressed by the following formula Y-1

(Y-1)

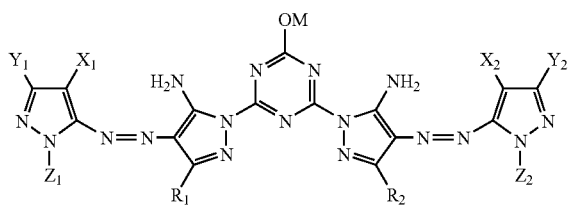

(in the formula, $X_1$, $X_2$, $Y_1$, and $Y_2$ represent a hydrogen atom or a cyano group, $Z_1$ and $Z_2$ represent a substitution group with an aromatic ring, $R_1$ and $R_2$ represent an alkyl group, and M is a metal atom)

the cyan ink composition containing as a colorant at least one type of compound selected from the group consisting of compounds or salts thereof expressed by the following Formula C-1

(C-1)

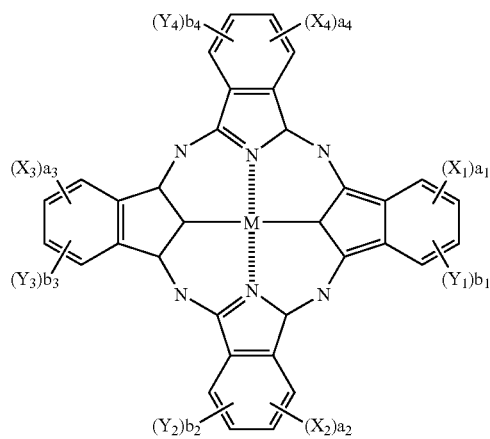

(in Formula C-1, $X_1$, $X_2$, $X_3$, and $X_4$ independently represent either —SO—Z or —$SO_2$—Z; here Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$Y_1$, $Y_2$, $Y_3$, and $Y_4$ independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, an ureido group, a sulfamoylamino group, an alkylthio group, an arylthio group, an alkoxycarbonylamino group, a sulfonamide group, a carbamoyl group, an alkoxycarbonyl group, a heterocycloxy group, an azo group, an acyloxy group, a carbamoyloxy group, a silyloxy group, an aryloxycalbonyl group, an aryloxycalbonylamino group, an imido group, a heterocyclthio group, a phospholyl group, an acyl group, or an ionic hydrophilic group, and each of the groups may also have substitution groups;

$a_1$ through $a_4$ and $b_1$ through $b_4$ represent the number of substitution groups of $X_1$ through $X_4$ and $Y_1$ through $Y_4$;

furthermore $a_1$ through $a_4$ are independently integers between 0 and 4, but are not all simultaneously 0; $b_1$ through $b_4$ are independently integers between 0 and 4;

M represents a hydrogen atom, a metal atom or oxide thereof, a hydroxide, or a halide; however, at least one of $X_1$, $X_2$, $X_3$, $X_4$, $Y_1$, $Y_2$, $Y_3$, and $Y_4$ is an ionic hydrophilic group or a group which has an ionic hydrophilic group as a substitution group).

Furthermore, with the ink set of the present invention, the compound expressed by Formula M-1 that is preferably a colorant in the magenta ink composition is a compound expressed by the following Formula M-3.

(M-3)

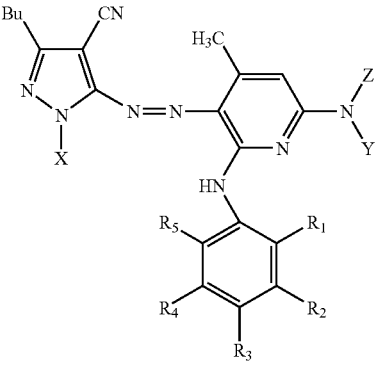

(In Formula M-3, $R_1$ through $R_5$ represent a hydrogen atom, alkyl group, sulfo group, or salt thereof, and when $R_1$ and $R_5$ are independently both alkyl groups, the total number of carbons in the alkyl groups is 3 or more, and substitution groups may also be present. X represents a hydrogen atom, an aliphatic group, an aromatic group, or a heterocyclic group, and Y and Z each independently represent a hydrogen atom, and an aliphatic group, an aromatic group, a heterocyclic group, an acyl group, an alkyloxycarbonyl group, an aryloxycarbonyl group, a carbamoyl group, an alkylsulfonyl group, an arylsulfonyl group, or a sulfamoyl group. Each group may also have a substitution group.)

Furthermore, with the ink set of the present invention, the compound expressed by Formula M-3 is preferably the compound expressed by the following Formula M-4.

(M-4)

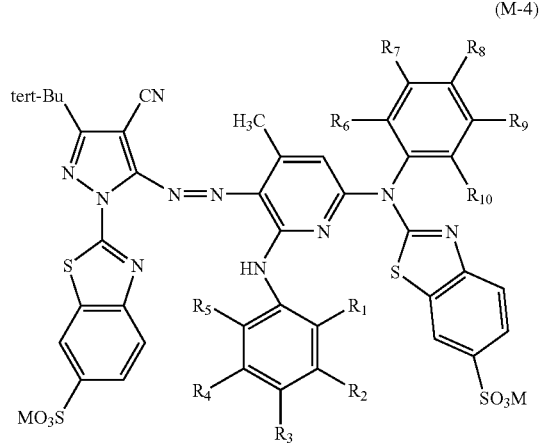

(In Formula M-4, $R_1$ through $R_{10}$ represent a hydrogen atom, alkyl group, sulfo group, or salt thereof, and when ($R_1$ and $R_5$) or ($R_6$ and $R_{10}$) are independently both alkyl groups, the total number of carbons in the alkyl groups is 3 or more, and substitution groups may also be present. Furthermore, M represents a hydrogen atom or an alkali metal atom.)

Furthermore, with the ink set of the present invention, the n in the compound expressed by the Formula M-2 which is contained as a colorant in the magenta ink composition is preferably 2.

Furthermore, with the ink set of the present invention, the magenta ink composition preferably contains between 0.2 and 2.5 wt % of at least one type of compound expressed by Formula M-1 and between 0.4 and 7.0 wt % of at least one type of compound expressed by Formula M-2, based on the total weight of the magenta ink composition.

Furthermore, with the ink set of the present invention, the total amount of colorant solids with regards to the total weight of the magenta ink composition is preferably between 0.6 and 8.0 wt %.

Furthermore, with the ink set of the present invention, the content ratio of the compound expressed by Formula M-1 and the compound expressed by Formula M-2 in the magenta ink composition is preferably between 2:1 and 1:8.

Furthermore, with the ink set of the present invention, preferably the magenta ink composition further contains a betaine surfactant expressed by the following b-1.

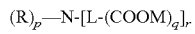  (b-1)

(In the aforementioned Formula b-1, R represents a hydrogen atom, an alkyl group, an aryl group, or a heterocyclic group. L represents a bonding group with a valence of two or higher. M represents a hydrogen atom, an alkali metal atom, an ammonium group, a protonated organic amine or nitrogen containing heterocyclic group, or a quaternary ammonium ion group, and represents a group that does not exist as a cation if M can be a counter ion for the ammonium ion comprising the nitrogen atom shown in Formula b-1. q represents an integer 1 or greater, and r represent an integer between 1 and 4. p represents an integer between 0 and 4, and p+r is either 3 or 4. If p+r is 4, N represents a nitrogen atom that forms a quaternary amine. If p is 2 or higher, R may be the same or may be different. If q is 2 or higher, COOM may be the same or may be different. If r is 2 or higher, L-(COOM)$_q$ may be the same or may be different.)

Furthermore, with the ink set of the present invention, the betaine surfactant expressed by Formula b-1 is preferably the compound expressed by the following Formula b-2.

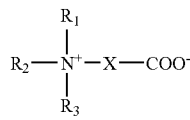  (b-2)

(In Formula b-2, $R_1$ through $R_3$ represent alkyl groups with between 1 and 20 carbons, and X represents a bonding group with a valence of 2.)

Furthermore, with the ink set of the present invention, the compound expressed by Formula b-2 is preferably the compound expressed by the following Formula b-3.

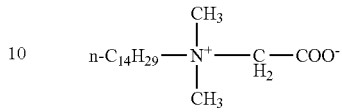  (b-3)

Furthermore, with the ink set of the present invention, the content weight ratio of the compound expressed by Formula M-1 and the betaine surfactant expressed by Formula b-1 in the magenta ink composition is preferably between 1:3 and 3:1.

Furthermore, with the ink set of the present invention, the compound expressed by Formula Y-1 which is contained in the yellow ink composition as a colorant is preferably a compound expressed by the following Formula Y-2

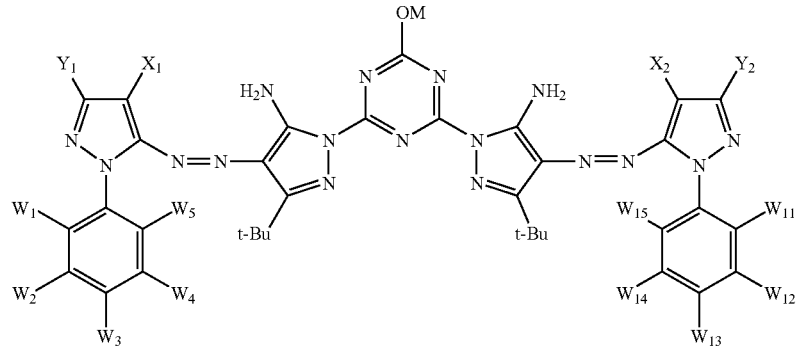  (Y-2)

(in the formula, $X_1$, $X_2$, $Y_1$, and $Y_2$ represent a hydrogen atom or a cyano group, $W_1$ through $W_5$ and $W_{11}$ through $W_{15}$ each represent a hydrogen atom, or a carboxyl group or salt thereof, M represents a metal atom, and t-Bu represent a tertiary butyl group).

Furthermore, in the ink set of the present invention, the yellow ink composition preferably also contains as a colorant at least one type of compound expressed by the following formula Y-3.

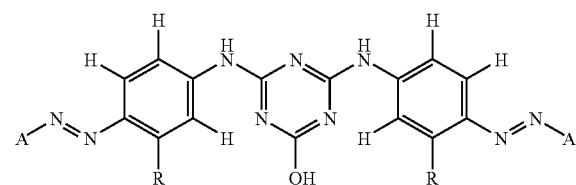  (Y-3)

(In the formula, R represents a methoxy group or a methyl group, and A represents 1,5-disulfonaphtho-3-yl or 1,5,7-trisulfonaphtho-2-yl.)

Furthermore, with the ink set of the present invention, the total amount of colorant in the yellow ink composition is preferably between 1 and 7 wt % based on the total amount of yellow ink composition.

Furthermore, with the ink set of the present invention, in the compound expressed by Formula C-1 that is contained as the cyan dye in the cyan ink composition, preferably M represents a copper atom, $X_1$, $X_2$, $X_3$, and $X_4$ represent —$SO_2Z$, Z represents $R^5$ ($R^5$ represents —$(CH_2)_3SO_3M^2$ where $M^2$ represents an alkali metal atom) or $R^6$ ($R^6$ represents —$(CH_2)_3SO_2NHCH_2CH(OH)CH_3$), $Y_1$, $Y_2$, $Y_3$, and $Y_4$ are hydrogen atoms, $a_1$, $a_2$, $a_3$, and $a_4$ are either 0 or 1, two or more of $a_1$, $a_2$, $a_3$ and $a_4$ are 1, and $b_1$, $b_2$, $b_3$, and $b_4$ are integers such that the sum of each of them with the corresponding $a_1$, $a_2$, $a_3$, and $a_4$ is 4.

Furthermore, with the ink set of the present invention, $M^2$ preferably represents lithium.

Furthermore, with the ink set of the present invention, in the cyan dye, preferably Z in the compound expressed by Formula C-1 independently represents a blend consisting of tetrasulfonates, trisulfonates, and disulfonates selected from $R^5$ or $R^6$, and the molar ratio of $R^5$ and $R^6$ contained in the overall cyan dye is $R^5/R^6=3/1$.

Furthermore, with the ink set of the present invention, at least one type of compound selected from the group consisting of compounds or salts thereof expressed by Formula C-1 is preferably contained as a colorant in the cyan ink composition, and the total amount of colorant contained therein is between 1.0 and 10 wt % based on the total weight of the cyan ink composition.

Furthermore, with the ink set of the present invention, the cyan ink composition preferably contains at least one type of compound selected from the group consisting of naphthalene based aromatic compounds or salts thereof having a carboxyl group in the second position.

Furthermore, with the ink set of the present invention, the salt of the naphthalene based aromatic compound having a carboxyl group in the second position is preferably a lithium salt.

Furthermore, the ink set of the present invention preferably also contains a black ink composition.

Furthermore, with the ink set of the present invention, preferably the black ink composition contains a colorant expressed by the following Formula Bk-1.

(In Formula Bk-1, $A_1$ is a substitution group expressed by Formula Bk-2 or Bk-3, $A_2$ is a substitution group expressed by Formula Bk-4 or Bk-5, and $A_3$ is a substitution group expressed by Formula Bk-6.)

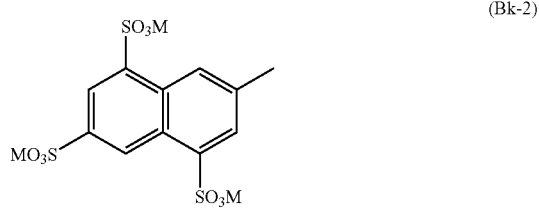

(in Formula Bk-2, M represents either lithium or sodium.)

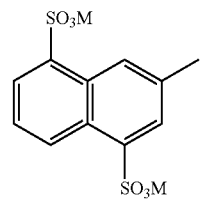

(in Formula Bk-3, M represents either lithium or sodium.)

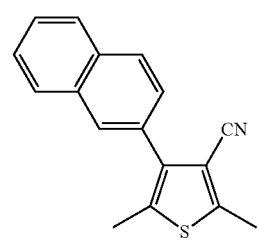

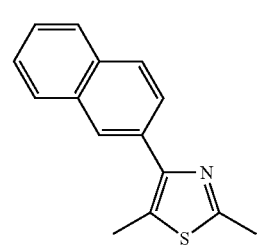

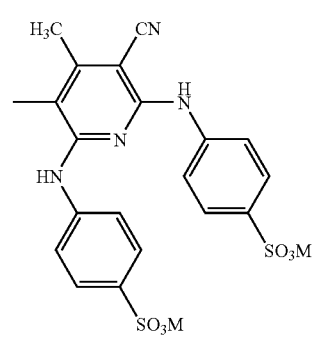

(in Formula Bk-6, M represents either lithium or sodium.)

Furthermore, with the ink set of the present invention, preferably the black ink composition further contains a colorant expressed by the following Formula Bk-7.

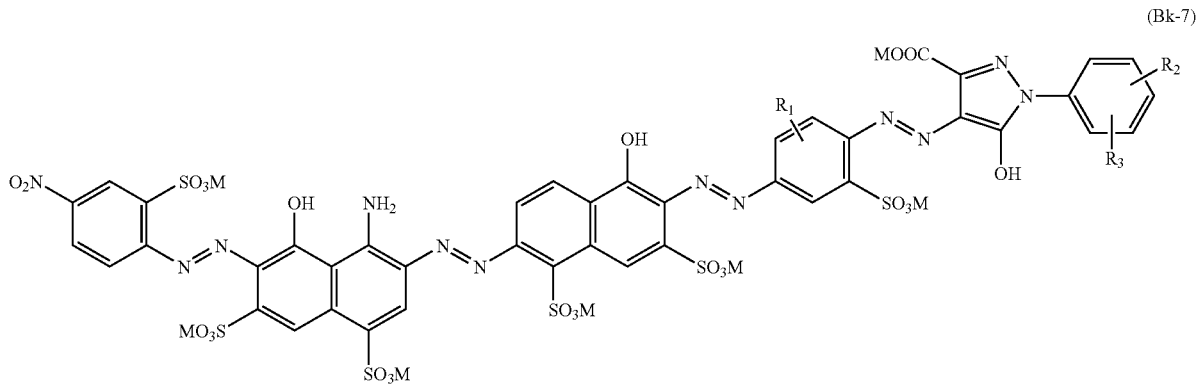
(Bk-7)

(in Formula Bk-7, $R_1$ represents a halogen atom, H, $SO_3M$, or COOM, $R_2$ and $R_3$ independently represent H, $SO_3M$, or COOM, and M represents either lithium or sodium. However, $R_2$ and $R_3$ are not both H)

Furthermore, with the ink set of the present invention, the total of the amount of colorant expressed by Formula Bk-1 and the amount of colorant expressed by Formula Bk-7 is preferably between 5 and 8 wt % of the black ink composition.

Furthermore, with the ink set of the present invention, the formulation ratio of the colorant expressed by Formula Bk-1 and the colorant expressed by Formula Bk-7 in the black ink composition is preferably between 2:1 and 1:2.

Furthermore, with the ink set of the present invention, preferably the black ink composition further contains a colorant expressed by the following Formula Adj-1.

Furthermore, with the ink set of the present invention, preferably the black ink composition further contains C. I. Direct Yellow 86 as a colorant.

Furthermore, with the ink set of the present invention, the ink composition preferably contains a nonionic surfactant.

Furthermore, with the ink set of the present invention, the nonionic surfactant is preferably an acetylene glycol surfactant.

Furthermore, with the ink set of the present invention, the ink composition preferably contains between 0.1 and 5 wt % of the nonionic surfactant.

Furthermore, with the ink set of the present invention, the ink composition preferably contains a penetration enhancing agent.

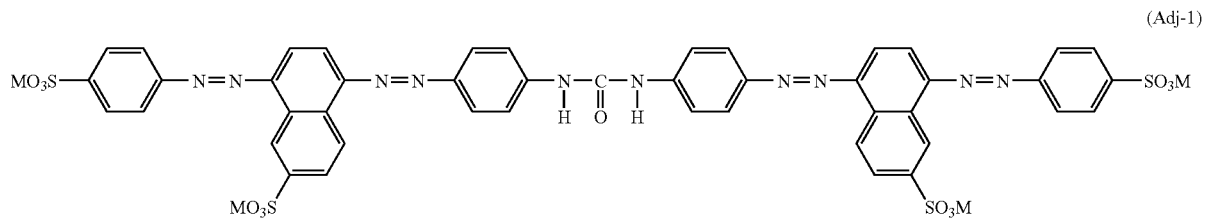
(Adj-1)

(in the formula, M represents either lithium or sodium.)

Furthermore, with the ink set of the present invention, the colorant expressed by Formula Adj-1 is preferably the colorant expressed by the following Formula Adj-1-1.

Furthermore, with the ink set of the present invention, the penetration enhancing agent is preferably a glycol ether.

The ink cartridge of the present invention integrally or independently stores the ink set.

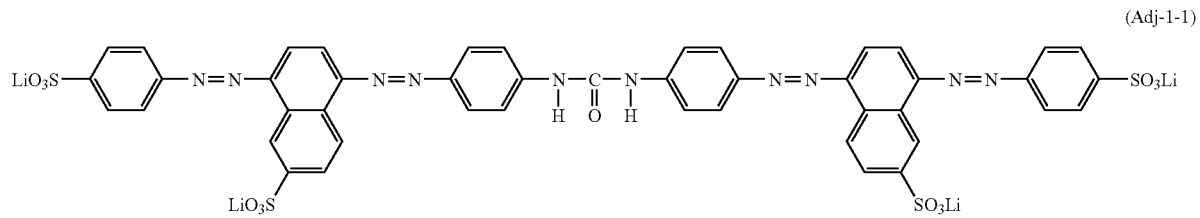
(Adj-1-1)

The inkjet recording method of the present invention records uses the aforementioned ink set or the aforementioned ink cartridge.

The recorded matter of the present invention is recorded using the aforementioned ink set or the aforementioned ink cartridge.

The ink set of the present invention uses a compound expressed by Formula C-1 or salt thereof (hereinafter jointly referred to as Formula C-1 dye) as a colorant of the cyan ink composition, and uses a compound expressed by Formula M-1 and a compound expressed by Formula M-2 as the colorant in the magenta ink composition, and the compound expressed by Formula Y-1 as the colorant in the yellow ink composition, and therefore the ozonefastness, lightfastness, and humidityfastness will be excellent for the image printed on recorded matter using this ink set.

DESCRIPTION OF EXEMPLARY EMBODIMENTS

The present inventors have constructed an ink set by combining various types of ink compositions in a plurality of colors, and using this ink set, have performed investigations to improve the ozonefastness, lightfastness, and humidityfastness. As a result, the present inventors have discovered that an ink set that provides an image on recorded matter that has excellent ozonefastness, lightfastness, and humidityfastness, while the difference in the rate of degradation due to ozone and light of the cyan dye and the magenta dye will be small, so an ink set can be provided where degradation of the entire image will not easily be perceived by the observer even if a certain amount of image degradation due to ozone and light proceeds.

The ink set of the present invention is used for a recording method that uses an ink composition, and examples of the recording method that use an ink composition include an inkjet recording method, a recording method using a writing instrument such as a pen, as well as various other types of printing and printing methods. In particular, the ink set of the present invention preferably is an ink set that uses an inkjet printing method.

Each of the ink compositions included in the ink set of the present invention will be described. First the colorants included in each of the ink compositions will be described below for the ink compositions of each color. By using dyes which have specific chemical structures as the colorants in ink compositions for each color in the ink set of the present invention, lightfastness, ozonefastness, and humidityfastness of the entire ink set can be achieved.

The colorant that is used in the cyan ink composition that is a part of the ink set of the present invention will be described. The cyan based dye that is used as a colorant in the cyan ink composition of the present invention is a compound selected from the group consisting of phthalocyanine compounds or salts thereof expressed by the following Formula C-1.

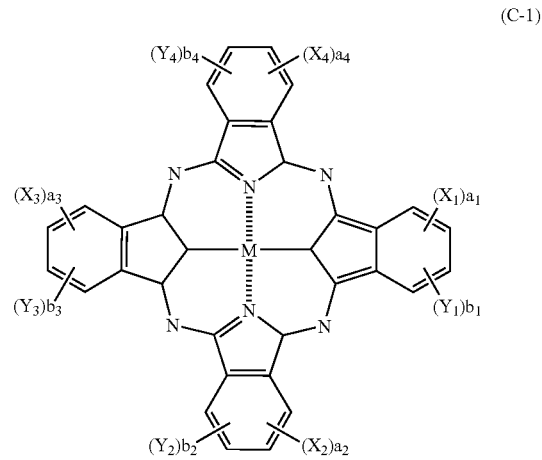

(C-1)

Herein, the $X_1$, $X_2$, $X_3$, and $X_4$ in Formula C-1 independently represent either —SO—Z or —SO$_2$—Z. Here, Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group.

$Y_1$, $Y_2$, $Y_3$, and $Y_4$ independently represent a hydrogen atom, a halogen atom, an alkyl group, a cycloalkyl group, an alkenyl group, an aralkyl group, an aryl group, a heterocyclic group, a cyano group, an hydroxyl group, a nitro group, an amino group, an alkylamino group, an alkoxy group, an aryloxy group, an amido group, an arylamino group, an ureido group, a sulfamoylamino group, an alkylthio group, an arylthio group, an alkoxycarbonylamino group, a sulfonamide group, a carbamoyl group, an alkoxycarbonyl group, a heterocycloxy group, an azo group, an acyloxy group, a carbamoyloxy group, a silyloxy group, an aryloxycalbonyl group, an aryloxycalbonylamino group, an imido group, a heterocyclthio group, a phospholyl group, an acyl group, or an ionic hydrophilic group, and each of the groups may also have substitution groups.

$a_1$ through $a_4$ and $b_1$ through $b_4$ represent the number of substitution groups of $X_1$ through $X_4$ and $Y_1$ through $Y_4$. Furthermore $a_1$ through $a_4$ are independently integers between 0 and 4, but are not all simultaneously 0. $b_1$ through $b_4$ are independently integers between 0 and 4.

M represents a hydrogen atom, a metal atom or oxide thereof, a hydroxide, or a halide.

However, at least one of $X_1$, $X_2$, $X_3$, $X_4$, $Y_1$, $Y_2$, $Y_3$, and $Y_4$ is an ionic hydrophilic group or a group which has an ionic hydrophilic group as a substitution group.

In the aforementioned Formula C-1 of the present invention, $a_1$, $a_2$, $a_3$, and $a_4$ are preferably either 0 or 1, two or more of $a_1$, $a_2$, $a_3$, and $a_4$ are 1, and $b_1$, $b_2$, $b_3$, and $b_4$ are preferably such that the sum with the corresponding $a_1$, $a_2$, $a_3$, and $a_4$ equals 4.

As described above, the $X_1$, $X_2$, $X_3$, and $X_4$ in the aforementioned Formula C-1 are independently represent either —SO—Z or —SO$_2$—Z, where Z can further have a substitution group, and examples of the substitution groups that can be on Z include a halogen atom (for example a chlorine atom or a bromine atom); a straight chain or a branched chain alkyl group with between 1 and 12 carbons, an aralkyl group with between 7 and 18 carbons, and alkenyl group with between 2 and 12 carbons, a straight chain or branched chain alkynyl group with between 2 and 12 carbons, a cycloalkyl group with between 3 and 12 carbons which may also have a side chain, a cycloalkenyl group with between 3 and 12 carbons which may also have a side chain (examples of these groups include methyl, ethyl, propyl, isopropyl, t-butyl, 2-methanesulfonyl ethyl, 3-phenoxy propyl, trifluoromethyl, and cyclopentyl); aryl groups (such as phenyl, 4-t-butylphenyl, and 2,4-di-t-amylphenyl); heterocyclic groups (such as imidazolyl, pirazolyl, triazolyl, 2-furyl, 2-thienyl, 2-primidinyl, and 2-benzothiazolyl); alkyloxy groups (such as methoxy, ethoxy, 2-methoxyethoxy, and 2-methanesulfonylethoxy); aryloxy groups (such as phenoxy, 2-methylphenoxy, 4-t-butylphenoxy, 3-nitrophenoxy, 3-t-butyloxycarbamoylphenoxy, and 3-methoxycarbamoyl); acylamino groups (such as acetoamido, benzamido, and 4-(3-t-butyl-4-hydroxyphenoxy)butaneamido); alkylamino groups (such as methylamino, butylamino, diethylamino, and methylbutylamino); anilino groups (such as phenylamino and 2-chloroanilino); ureido groups (such as phenylureido, methylureido, and N,N-dibutylureido); sulfamoylamino groups (such as N,N-dipropylsulfamoylamino); alkylthio groups (such as methylthio, octylthio, and 2-phenoxyethylthio); arylthio groups (such as phenylthio, 2-butoxy-5-t-octylphenylthio, and 2-carboxyphenylthio); alkyloxycarbonylamino groups (such as methoxycarbonylamino); sulfonamide groups (such as methanesulfonamide, benzenesulfonamide, p-toluenesulfonamide, and octadecane); carbamoyl groups (such as N-ethyl carbamoyl, and N,N-dibutylcarbamoyl); sulfamoyl groups (such as N-ethyl sulfamoyl, N,N-dipropylsulfamoyl, and N,N-diethylsulfamoyl); sulfonyl groups (such as methanesulfonyl, octanesulfonyl, benzenesulfonyl, and toluenesulfonyl); alkyloxycarbonyl groups (such as methoxycarbonyl and butyloxycarbonyl); heterocycloxy groups (such as 1-phenyltetrazol-5-oxy, and 2-tetrahydropiranyloxy); azo groups (such as phenylazo, 4-methoxyphenylazo, 4-pivaroylaminophenylazo, 2-hydroxy-4-propanoylphenylazo); acyloxy groups (such as acetoxy); carbamoyloxy groups (such as N-methylcarbamoyloxy, and N-phenylcarbamoyloxy); silyloxy groups (such as trimethylsilyloxy, and dibutylmethylsilyloxy); aryloxycalbonylamino groups (such as phenoxycalbonylamino); imide groups (such as N-succinimide, and N-phthalimide); heterocyclothio groups (such as 2-benzothiazolylthio, 2,4-di-phenoxy-1,3,5-triazole-6-thio, and 2-piridylthio); sulfinyl groups (such as 3-phenoxypropyl-sufinyl); phosphonyl groups (such as phenoxyphosphonyl, octyloxyphosphonyl, and phenylphosphonyl); aryloxycarbonyl groups (such as phenoxycarbonyl); acyl groups (such as acetyl, 3-phenylpropanoyl, and benzoyl); ionic hydrophilic groups (such as carboxyl groups, sulfo groups, and quaternary ammonium groups); cyano groups; hydroxy groups; nitro groups; and amino groups and the like.

Furthermore, the ionic hydrophilic group in Formula C-1 includes sulfo groups, carboxyl groups, and quaternary ammonium groups and the like. The ionic hydrophilic group is preferably a carboxyl group or a sulfo group, and a sulfo group is particularly preferable. The carboxyl group and the sulfo group can be salts, and specific examples of the counterion that forms the salt include alkali metal ions (such as a sodium ion, a potassium ion, or a lithium ion) and organic cations (such as a tetramethylguanidium ion).

Of the compounds expressed by Formula C-1, compounds where M in Formula C-1 is a copper atom, $X_1$ through $X_4$ represent $—SO_2Z$, where Z represents $R^5$ ($R^5$ represents $—(CH_2)_3SO_3M^2$ where $M^2$ represents an alkali metal atom.) and/or $R^6$ ($R^6$ represents $—(CH_2)_3SO_2NHCH_2CH(OH)CH_3$) are preferable, and those compounds where $M^2$ is lithium are even more preferable. In particular, those compounds expressed by Formula C-1 are preferably blends of tetrasulfonic acids, trisulfonic acids, and disulfonic acids where $R^5$, $R^6$ (molar ratio)=3/1. These tetrasulfonic acids, trisulfonic acids, and disulfonic acids correspond to the case where $a_1$ through $a_4$ in Formula C-1 are all equal to 1, the case where any three of $a_1$ through $a_4$ are equal to 1 and one is equal to 0, and the case where any two of $a_1$ through $a_4$ are equal to 1, and the other two are equal to 0, respectively.

In particular, in the compound expressed by Formula C-1 that is the cyan dye, the case where M represents a copper atom, $X_1$, $X_2$, $X_3$, and $X_4$ represent $—SO_2Z$, Z represents $R^5$ ($R^5$ represents $—(CH_2)_3SO_3M^2$ where $M^2$ represents an alkali metal atom.) or $R^6$ ($R^6$ represents $—(CH_2)_3SO_2NHCH_2CH(OH)CH_3$), $Y_1$, $Y_2$, $Y_3$, and $Y_4$ are hydrogen atoms, $a_1$, $a_2$, $a_3$, and $a_4$ are either 0 or 1, two or more of $a_1$, $a_2$, $a_3$ and $a_4$ are 1, and $b_1$, $b_2$, $b_3$, and $b_4$ are integers such that the sum of each of them with the corresponding $a_1$, $a_2$, $a_3$, and $a_4$ is 4 is particularly preferable because a colorant with favorable tone (including chroma) can be provided, while also ensuring water solubility.

In this case, if $M_2$ is lithium, the water solubility of the colorant can be ensured, and bronzing can be avoided, so this is even more preferable.

Furthermore, in this case, Z independently represents a blend consisting of tetrasulfonates, trisulfonates, and disulfonates selected from $R^5$ or $R^6$, and the molar ratio of $R^5$ and $R^6$ contained in the overall cyan dye is $R^5/R^6$=3/1, but preferably both ozonefastness and suppression of bronzing are achieved to a higher dimension.

The method of synthesizing the compound shown in Formula C-1 will be shown below.

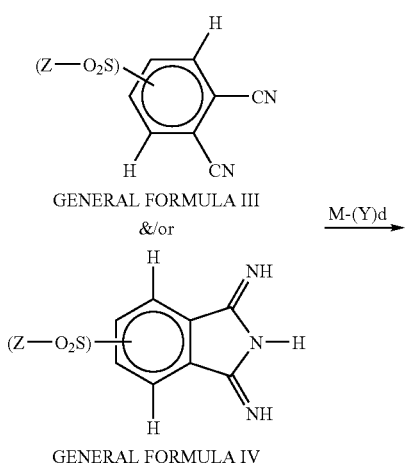

GENERAL FORMULA III
&/or

GENERAL FORMULA IV

M-(Y)d →

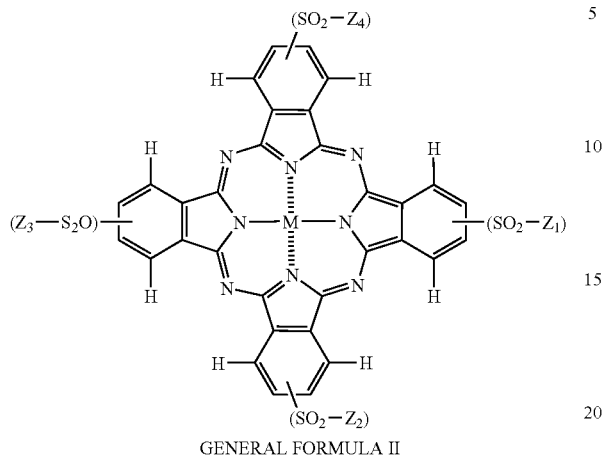

GENERAL FORMULA II

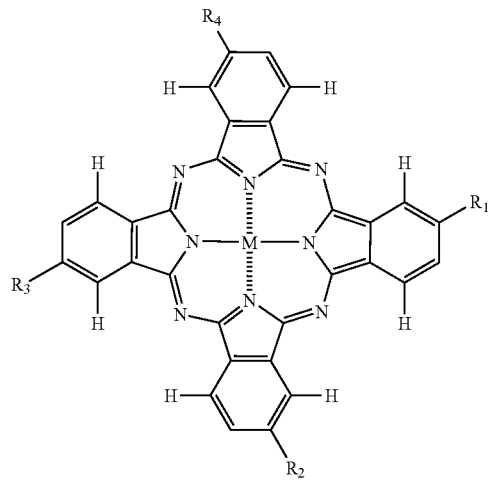

GENERAL FORMULA a-1

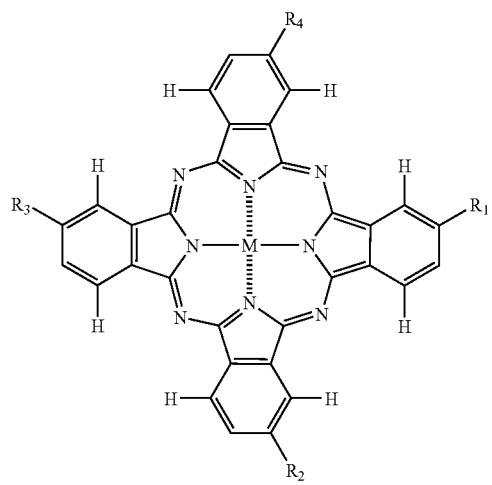

GENERAL FORMULA a-2

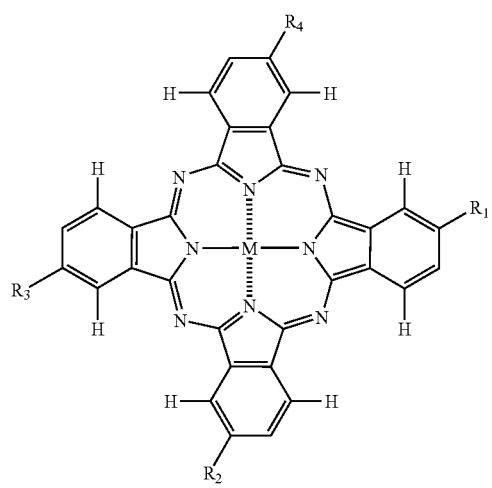

GENERAL FORMULA a-3

In the aforementioned reaction, the phthalocyanine compound expressed by general formula II is one form of the compound expressed by Formula C-1, and is a compound that can be used at the present invention. The phthalocyanine compound expressed by general formula II can be synthesized by reacting a metal derivative expressed by M-(Y)d with a phthalonitrile compound expressed by general formula III and/or a diiminoisoindoline compound expressed by general formula IV. Note, in general formula II, general formula III, and general formula IV, Z and $Z_1$ through $Z_4$ have the same meaning as Z in Formula C-1, and M has the same meaning as in Formula C-1. Here, Y represents a monovalent or divalent ligand such as a halogen atom, an acetate anion, an acetylacetonate, or an oxygen atom or the like, and d represents an integer between 1 and 4. Examples of metal derivatives expressed by M-(Y)d include halides, carboxylate derivatives, sulfate, nitrate, carbonyl compounds, oxides, and complexes or the like of Al, Si, Ti, V, Mn, Fe, Co, Ni, Cu, Zn, Ge, Ru, Rh, Pd, In, Sn, Pt, and Pb. Specific examples of these metal derivatives include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, acetylacetone manganese, manganese chloride, lead chloride, lead acetate, indium chloride, titanium chloride, and tin chloride and the like.

The compound expressed by general formula II obtained in this manner normally is a blend of compounds expressed by the following general formulas a-1 through a-4 which are isomers for the positions of ($SO_2$—$Z_1$), ($SO_2$—$Z_2$), ($SO_2$—$Z_3$), and ($SO_2$—$Z_4$) in general formula II (these groups also correspond to $R_1$, $R_2$, $R_3$, and $R_4$ in Formula 1).

-continued

GENERAL FORMULA a-4

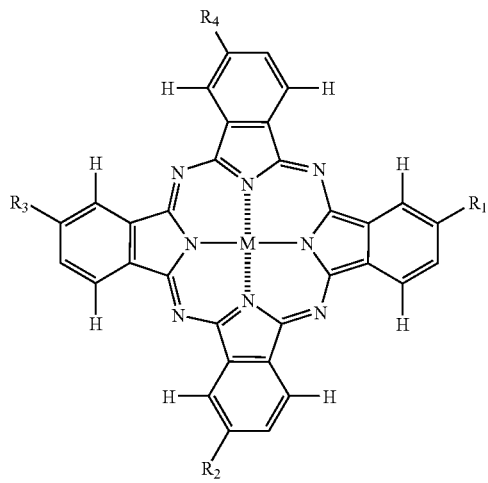

In the present invention, the amount of cyan based dye included in the cyan ink composition is determined by the types of $X_1$ through $X_4$ and $Y_1$ through $Y_4$, as well as the type of solvent component used for manufacturing the ink composition, but in the present invention, the total amount of cyan based dye (Formula C-1 dye) expressed by Formula C-1 in the cyan ink composition is preferably between 1 and 10 wt %, more preferably between 2 and 6 wt % of the total amount of cyan ink composition. If the total amount of Formula C-1 dye included in the cyan ink composition is 1 wt % or higher, the chromic properties of the ink on the recording medium after printing will be favorable, and the required image density can be achieved. Furthermore, if the total amount of C-1 dye included in the cyan ink composition is 10 wt % or lower, the discharge properties of the cyan ink composition will be favorable when using the inkjet recording method, and the inkjet nozzles will not easily become plugged, and the like.

As described above, with the cyan ink composition in the ink set of the present invention, other cyan based dyes can also be used in order to adjust the color of the ink, to the degree that the lightfastness, ozonefastness, and humidityfastness are not severely affected.

Examples of other cyan based dyes which can be used with the present invention include C. I. Direct Blue 1, 10, 15, 22, 25, 55, 67, 68, 71, 76, 77, 78, 80, 84, 86, 87, 90, 98, 106, 108, 109, 151, 156, 158, 159, 160, 168, 189, 192, 193, 194, 199, 200, 201, 202, 203, 207, 211, 213, 214, 218, 225, 229, 236, 237, 244, 248, 249, 251, 252, 264, 270, 280, 288, 289, 291, C. I. Acid Blue 9, 25, 40, 41, 62, 72, 76, 78, 80, 82, 92, 106, 112, 113, 120, 127:1, 129, 138, 143, 175, 181, 205, 207, 220, 221, 230, 232, 247, 258, 260, 264, 271, 277, 278, 279, 280, 288, 290, 326, C. I. Reactive Blue 2, 3, 5, 8, 10, 13, 14, 15, 17, 18, 19, 21, 25, 26, 27, 28, 29, 38, C. I. Basic Blue 1, 3, 5, 7, 9, 22, 26, 41, 45, 46, 47, 54, 57, 60, 62, 65, 66, 69, 71, and the like, but there is no restriction to only these.

With the present invention, the cyan ink composition preferably contains at least one type of compound selected from naphthalene based aromatic compounds or salts thereof having a carboxyl group in the second position. By adding at least one type of compound selected from the group consisting of naphthalene based aromatic compounds or salts thereof having a carboxyl group in the second position, the occurrence of bronzing phenomenon with the cyan ink composition can be prevented. The aforementioned bronzing phenomenon is known to be a phenomenon where floating red is observed in an area where high duty printing such as fill printing is performed on special inkjet recording media (particularly high gloss recording media) using an ink composition which contains a cyan based dye. When the bronzing phenomenon occurs, the color balance of the entire image will be nonuniform and the image quality will be degraded, so a favorable image will not be obtained.

Of the naphthalene based aromatic compounds with a carboxyl group in the second position which are used with the present invention, alkali metal salts of naphthalene based aromatic compounds with a carboxyl group in the second position are particularly preferable. Of these alkali metal salts, the use of lithium salt is particularly preferable. If lithium salts is used, not only can the bronzing phenomenon be prevented, but plugging of the inkjet nozzle will not easily occur.

Examples of naphthalene based aromatic compounds with a carboxyl group in the second position or salts thereof include 2-naphthoic acid, 1-hydroxy-2-naphthoic acid, 3-hydroxy-2-naphthoic acid, 6-hydroxy-2-naphthoic acid, 4-hydroxybenzoic acid, 2,6-naphthalene dicarboxylic acid, 3-methoxy-2-naphthoic acid, 3-ethoxy-2-naphthoic acid, 3-propoxy-2-naphthoic acid, 6-methoxy-2-naphthoic acid, 6-ethoxy-2-naphthoic acid, and 6-propoxy-2-naphthoic acid and the like, as well as salts thereof, particularly lithium salts. 2-naphthoic acid and the lithium salt thereof are particularly preferable.

The method of adding a salt of a naphthalene based aromatic compound with a carboxyl group in the second position to the ink composition can be either a method of adding the compound to the ink in the form of a salt, or a method of adding the compound to the ink composition and then separately adding a base that can form a salt with the naphthalene based aromatic compound that has a carboxyl group in the second position. Furthermore, at least one type of compound selected from the group consisting of naphthalene based aromatic compounds with a carboxyl group in the second position and salts thereof can be used with the present invention, or both a naphthalene based aromatic compound with a carboxyl group at the second position and a salt thereof can be used in combination.

If at least one type of compound selected from the group consisting of naphthalene based aromatic compounds with a carboxyl group at the second position or salt thereof (hereinafter referred to as naphthalene based aromatic compound with a carboxyl group at the second position) is added to the cyan ink composition of the ink set of the present invention, the total amount of naphthalene based aromatic compound having a carboxyl group at the second position added is preferably between 0.1 and 10 wt %, more preferably between 0.5 and 5 wt % of the total amount of the ink composition. The suitable and preferable amount of naphthalene-based aromatic compound having a carboxyl group in the second position or the like included in the ink composition can be determined based on the type of compound, the types of dyes included in the ink composition, and the type of solvent used in the ink composition, and the like.

The ratio of the amount of cyan dye (wt %) included in the cyan ink composition and the amount of naphthalene based aromatic compound having a carboxyl group in the second position (wt %) is preferably between 1:0.1 and 1:10, more preferably between 1:0.3 and 1:6. If the amount of cyan dye in the cyan ink composition is 1, occurrence of the bronzing phenomenon can be reduced if the amount of naphthalene based aromatic carboxylic acid with a carboxyl group at the second position is greater than 0.1, and plugging of the inkjet nozzles can be prevented if the amount of naphthalene based aromatic compound having a carboxyl group at the second position is less than 10.

Furthermore, in order to stabilize and dissolve the naphthalene based aromatic compound having a carboxyl group in the second position in the cyan ink composition, the pH of the ink composition at 20° C. is preferably 8.0 or higher. Note, the pH of the ink composition of the present invention is the value measured using a commercial pH meter by directly inserting the pH electrode into the ink composition.

group, aryl group, or heterocyclic group, an acylamino group, a ureido group, a sulfamoylamino group, alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group, or a heterocyclothio group. Each group may also have a substitution group. Furthermore, $R^1$ and $R^5$ or $R^5$ and $R^6$ bonded together can form a 5 or 6 membered ring.)

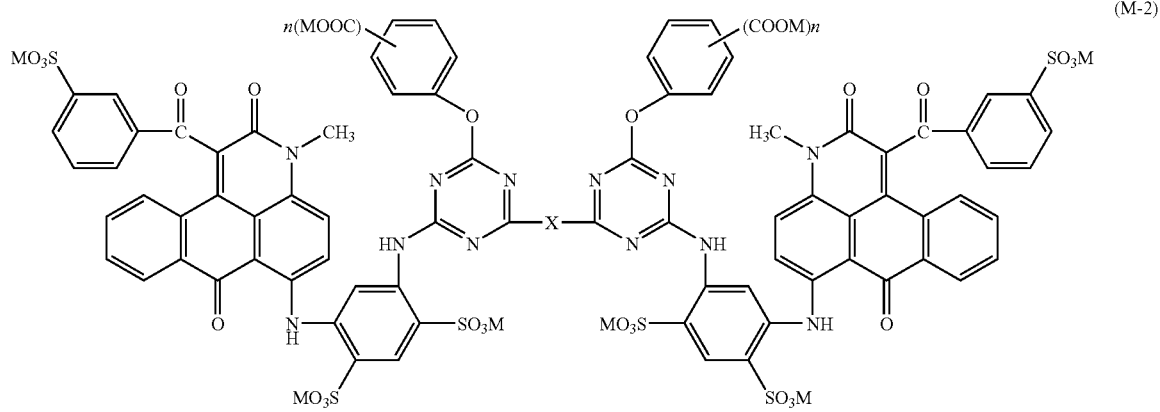

Next, the colorant that is used in the magenta ink composition of the ink set of the present invention will be described.

With the present invention, the magenta ink composition contains as a colorant at least one type of compound expressed by the following formula M-1, and at least one type of compound expressed by the following formula M-2.

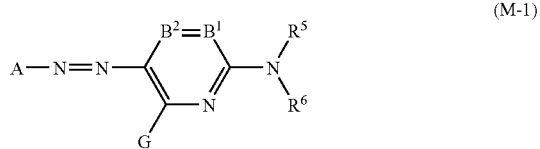

(in Formula M-1, A represents a residue of a five membered heterocyclic diazo component $A-NH^2$. $B^1$ and $B^2$ each represent —$CR^1$= or —$CR^2$=, or either one represents a nitrogen atom while the other represent either —$CR^1$= or —$CR^2$=. $R^5$ and $R^6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Each group may also have a substitution group. G, $R^1$, and $R^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocycloxy group, an alkoxycarbonyloxy group, an aryloxycarbonyloxy group, an amino group substituted with an alkyl Here, in Formula M-2, M represents a hydrogen atom, ammonium group, or alkali metal atom, X represents a diaminoalkylene group, and n is either 1 or 2.

The magenta ink composition used in the ink set of the present invention contains as a colorant at least one type of compound expressed by Formula M-1 and at least one type of compound expressed by Formula M-2 in an aqueous medium consisting of water and water-soluble organic solvents, and if necessary, can also contain a moisture retaining agent, a surfactant, a penetration enhancer, a viscosity adjusting agent, a pH adjusting agent, and other additives. By jointly using the compound expressed by Formula M-1 and the compound expressed by Formula M-2, an ink composition can be provided that has excellent lightfastness, ozonefastness, and humidityfastness, and that also has balanced properties.

The preferable form of the magenta ink composition is an ink composition that provides enhanced stability, humidityfastness, lightfastness, and ozonefastness to the recorded matter of the colorant, by adding as additives the detained based surfactant expressed by Formulas b-1 through b-3, an antifoaming agent, and aromatic compound containing a carboxyl group, a urea derivative, a nonionic surfactant, and a penetration enhancer, added either independently or as a combination of two or more.

The compound expressed by general formula M-1 (magenta dye) used with the present invention can be a single compound used independently or a plurality of compound types may be used together.

The compound expressed by Formula M-1 is preferably the compound expressed by Formula M-3.

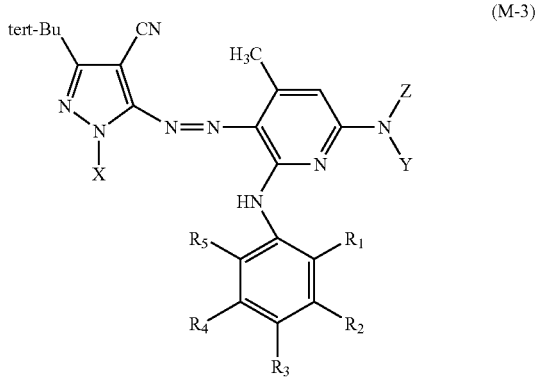

(M-3)

In Formula M-3, $R_1$ through $R_5$ represented a hydrogen atom, and an alkyl group, a sulfo group, or a salt thereof. When $R_1$ and $R_5$ in Formula M-3 are independently both alkyl groups, the total number of carbons in the alkyl groups is 3 or more, and substitution groups may also be present. X represents a hydrogen atom, an aliphatic group, an aromatic group, or a heterocyclic group, and Y and Z each independently represent a hydrogen atom, and an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group. Each group may also have a substitution group. Furthermore, if a sulfo group is included in $R_1$ through $R_5$, the form is —$SO_3M$. In this case, M is preferably an alkali metal atom, and more preferably is either lithium or sodium.

Of those compounds expressed by Formula M-3, compounds expressed by the formula M-4 are preferable for having excellent lightfastness and ozonefastness and improved humidityfastness toward betaine surfactants as will be discussed later.

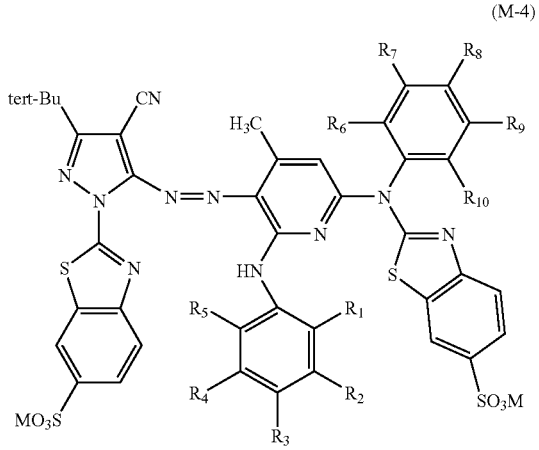

(M-4)

(In Formula M-4, $R_1$ through $R_{10}$ represent a hydrogen atom, alkyl group, sulfo group, or salt thereof, and when ($R_1$ and $R_5$) or ($R_6$ and $R_{10}$) are independently both alkyl groups, the total number of carbons in the alkyl groups is 3 or more, and substitution groups may also be present. Furthermore, M represents a hydrogen atom or an alkali metal atom.)

When the compound expressed by Formula M-1 added as a colorant to the magenta ink composition is used together with the compound expressed by Formula M-2 (magenta based dye), M represents a hydrogen atom, or an ammonium group or alkali metal atom that forms a salt, X represents a diaminoalkylene group, and n is either 1 or 2.

The addition of the compound expressed by general formula M-2 has a particularly strong effect at improving the humidityfastness. The compound expressed by general formula M-2 can be a single type used independently or a plurality of types may be used together. Of these compounds expressed by general formula M-2, compounds which have a construction where n equals 2 will have a favorable humidityfastness, and are particularly preferable.

Furthermore, other magenta based dyes can be jointly used in the magenta ink composition in order to adjust the color or the like to the degree that the various properties such as lightfastness are not significantly degraded.

Examples of magenta based dyes other than compounds expressed by Formula M-1 and Formula M-2 include C. I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243, 247, C. I. Direct Violet 7, 9, 47, 48, 51, 66, 90, 93, 94, 95, 98, 100, 101, C. I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396, 397, C. I. Acid Violet 5, 34, 43, 47, 48, 90, 103, 126, C. I. Reactive Red 3, 13, 17, 19, 21, 22, 23, 24, 29, 35, 37, 40, 41, 43, 45, 49, 55, C. I. Reactive Violet 1, 3, 4, 5, 6, 7, 8, 9, 16, 17, 22, 23, 24, 26, 27, 33, 34, C. I. Basic Red 12, 13, 14, 15, 18, 22, 23, 24, 25, 27, 29, 35, 36, 38, 39, 45, 46, C. I. Basic Violet 1, 2, 3, 7, 10, 15, 16, 20, 21, 25, 27, 28, 35, 37, 39, 40, 48 and the like.

In the magenta ink composition, the total amount of compound expressed by Formula M-1 added is preferably between 0.2 and 2.5 wt %, more preferably between 0.3 and 2.0 wt % based on the total weight of the ink composition. The lightfastness and the ozonefastness can be improved if the amount is 0.2 wt % or greater, and a drop in the humidityfastness can be prevented if the amount is 2.5 wt % or less.

Furthermore, the total amount of compound expressed by Formula M-2 added is preferably between 0.4 and 7.0 wt %, more preferably between 0.6 and 6 wt % based on the total weight of the ink composition. The humidityfastness can be improved if the amount is 0.4 wt % or greater, and a drop in the lightfastness can be prevented if the amount is 7.0 wt % or less.

Furthermore, in the magenta ink composition, the weight ratio of the compound expressed by Formula M-1 and the compound expressed by Formula M-2 is preferably in a range between 2:1 and 1:8, more preferably in a range between 1:1 and 1:6. By maintaining the content of both compounds in this ratio, the like resistance, ozonefastness, and humidityfastness can achieve a higher dimension of satisfaction.

Note, the total amount of solid colorant (solid dye fraction) in the magenta ink composition is preferably in a range between 0.6 and 8.0 wt % based on the total weight of the ink composition. If the amount is 0.6 wt % or higher, the required chromic properties (maximum intensity) can be obtained, and if the amount is 8.0 wt % or less, plugging while using the ink set or the like can be prevented.

In the magenta ink composition containing a compound expressed by Formula M-1 and a compound expressed by Formula M-2 as colorants, the adhesion of the colorant to the recording media can be dramatically improved by adding the betaine surfactant expressed by Formula b-1, while at the same time the humidityfastness will be improved, the lightfastness and ozonefastness will also be improved, and the recorded matter will be able to maintain a stable image for long period of time.

(In Formula b-1, R represents a hydrogen atom, an alkyl group, an aryl group, or a heterocyclic group. L represents a bonding group with a valence of two or higher. M represents a hydrogen atom, an alkali metal atom, an ammonium group, a protonated organic amine or nitrogen containing heterocyclic group, or a quaternary ammonium ion group, and represents a group that does not exist as a cation if M can be a counter ion for the ammonium ion comprising the nitrogen atom shown in Formula b-1. q represents an integer 1 or greater, and r represent an integer between 1 and 4. p represents an integer between 0 and 4, and p+r is either 3 or 4. If p+r is 4, N represents a nitrogen atom that forms a quaternary amine. If p is 2 or higher, R may be the same or may be different. If q is 2 or higher, COOM may be the same or may be different. If r is 2 or higher, L-(COOM)$_q$ may be the same or may be different.)

Of the betaine surfactants expressed by Formula b-1, those betaine surfactants expressed by Formula b-2 are preferable from the viewpoint of increased adhesion of the ink composition to the recording media. In Formula b-2, $R_1$ through $R_3$ represent alkyl groups with between 1 and 20 carbons, and X represents a bonding group with a valence of 2. In particular, those betaine surfactants expressed by Formula b-3 are highly preferable for the effect of increased adhesion of the ink composition to the recording media. The detained based surfactant expressed by general formula b-1 can be a single type used independently or a plurality of types may be blended and used together.

The effect of adding the between-based surfactant expressed by Formula b-1 is primarily to suppress a reduction in the humidityfastness caused by the compound expressed by Formula M-1, and to improve the adhesion of the colorants to the recording media, and the content weight ratio of the compound expressed by Formula M-1 and the betaine surfactant expressed by Formula b-1 is preferably in a range between 1:3 and 3:1, and more preferably in a range between 1:2 and 2:1. By maintaining the content ratio of the compound expressed by Formula M-1 and the betaine surfactant within this range, the adhesion of the colorant to the recording media can be dramatically improved.

As described above, the betaine surfactant expressed by Formula b-1 has a characteristic improving effect on the ink composition, and in particular has the effect of improving adhesion dramatically, but also causes foaming, and depending on the amount added and combinations with other additives, foaming of the ink composition may increase, the load on the ink system will increase, and the expense of building the system may increase.

Therefore, when a betaine surfactant with the aforementioned construction is added, specific antifoaming agents are preferably added.

In the magenta in composition, an antifoaming agent is used in conjunction with the betaine surfactant, and is preferably an aliphatic diol compound with between 4 and 6 carbons and 2 hydroxyl groups, or a diacetylene tetraol based compound.

Examples of the aliphatic diol compound which has between 4 and 6 carbons and 2 hydroxyl groups include 1,4-butanediol, 1,5-pentanediol, 1,2-hexanediol, 1,6-hexanediol, and the like, but of these, 1,2-hexanediol is preferable. Furthermore, the diacetylene tetraol based compound can be procured as a commercial product, and examples include Surfinol MD 20 and the like manufactured by Air Products Inc.

If the amount of the antifoaming agent added is too low, the antifoaming effect on the ink composition will be insufficient, but if too high, the printing quality and storage stability will be negatively affected. Therefore, the content in the ink composition of the present invention preferably between 0.05 and 10.0 wt %, and more preferably between 0.1 and 5.0 wt %.

Furthermore, by maintaining the content weight ratio of the antifoaming agent to the betaine surfactant expressed by Formula b-1 to a range between 1:10 and 4:1, an ink composition will be obtained which has a good balance between having excellent printing stability and excellent antifoaming effects and foam suppressing effects.

With the present invention, at least one type of compound selected from aromatic compounds with a carboxyl group or salt thereof is used in order to improve the humidityfastness and improve the adhesion of the colorant to the recording media. Any aromatic compound with at least one carboxyl group in the molecular structure can be used, but compounds with only one carboxyl group are preferable, and those with a naphthalene backbone are particularly preferable. Furthermore, compounds which have a naphthalene backbone and have a carboxyl group in the second position as well as salts thereof are more preferable, and alkali metal salts of compounds which have a naphthalene backbone and a carboxyl group at the second position are especially preferable. Of those alkali metal salts of compounds which have a naphthalene backbone and a carboxyl group in the second position, lithium salts are preferable for resisting plugging.

Specific examples of aromatic compounds with a carboxyl group or salts thereof include 2-hydroxy-1-naphthoic acid, 1-hydroxy-2-naphthoic acid, 1-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, 6-propoxy-2-naphthoic acid, and 4-hydroxybenzoic acid, and 2,6-naphthalene dicarboxylic acid and the like, as well as salts thereof, and particularly lithium salts.

Salts of an aromatic compounds which have a carboxyl group can be added in the form of a salt and included in the ink, or an aromatic compound with a carboxylic group and a base can be added separately to the ink.

The formulation amount of at least one compound selected from aromatic compounds having a carboxyl group or salt thereof is determined by a the type of aromatic compound having a carboxyl group and/or salt thereof, the type of colorants, the type of solvent component, and the other additives and the like, but the amount is preferably between 0.1 and 10 wt % based on the total weight of the ink composition, and preferably in a range between 0.5 and 5 wt %.

Furthermore, the content weight ratio between the compound expressed by Formula M-1 and the at least one type of compound selected from an aromatic compound having a carboxyl group or salt thereof preferably in a range between 5:1 and 1:3, and more preferably in a range between 3:1 and 1:2. If the aforementioned formulation ratio is higher than 5:1, the effect of improving the humidityfastness can be sufficiently achieved, and if the ratio is below 1:3, the plugging resistance (plugging reliability) can easily be ensured.

Adding a urea derivative to the magenta ink composition has the effect of enhancing the lightfastness.

Examples of the urea derivative that can be used with the present invention include urea, aryl urea, dimethylol urea, malonyl urea, carbamyl urea, n-butyl urea, dibutyl urea, N,N-dimethyl urea, 1,3-dimethyl urea, N-methyl urea, hydroxyurea, ethyl urea, methyl urea, creatinine, 2-imidazolidinone, benzyl urea, (R)-(+)-1-phenylethyl urea, phenyl urea, 3-hydroxyphenyl urea, 1-phenylsemicarbazide, 4-phenylsemicarbazide, N-benzoyl urea, and N,N'—O-phenylene urea, and the like, and these compounds can be used independently or can be used as a combination of two or more types.

The amount of the urea derivative is preferably in a range between 0.5 and 20 wt %, more preferably in a range between 1 and 16 wt %, and even more preferably in a range between 2 and 12 wt %, based on the total weight of the ink composition. The effect of improving the like resistance by adding a urea derivative can be clearly seen if the amount added is 0.5 wt % or higher, and good reliability with regards to plugging or the like can be maintained if the amount added is 20 wt % or less.

In the magenta ink composition, the content ratio of the compounds expressed by Formulas M-1 and M-2 and the urea derivative is preferably in a range between 5:1 and 1:10, more preferably in a range between 4:1 and 1:8, and even more preferably in a range between 3:1 and 1:5. By maintaining the ratio of both components in this range, the properties of increased lightfastness and enhanced reliability can be achieved to an even higher dimension.

In order to stabilize and dissolve the aforementioned colorant, benzene based surfactant, aromatic compound having a carboxyl group, aromatic compound having a carboxyl group, and urea derivative and the like, the pH (20° C.) of the ink composition is preferably at 8.0 or higher. Furthermore, when the compatibility with the materials is considered when the ink composition contacts with various types of materials, the pH of the ink composition is preferably 10.5 or lower. In order to better achieve both properties, the pH of the ink composition is more preferably adjusted to between 8.5 and 10.0.

Next, the colorant that is used in the yellow ink composition that is a part of the ink set of the present invention will be described.

In the ink set of the present invention, the yellow ink composition contains as a colorant at least one type of compound expressed by the following formula Y-1.

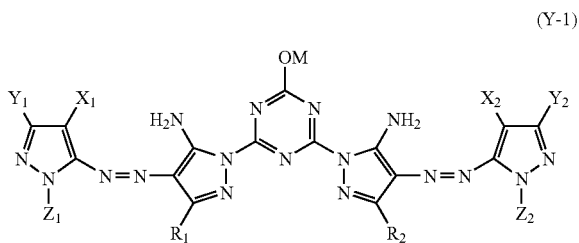

(Y-1)

(in the formula, $X_1$, $X_2$, $Y_1$, and $Y_2$ represent a hydrogen atom or a cyano group, $Z_1$ and $Z_2$ represent a substitution group with an aromatic ring, $R_1$ and $R_2$ represent an alkyl group, and M is a metal atom.)

In particular, the compound expressed by Formula Y-1 is preferably the compound expressed by Formula Y-2, from the viewpoint of improved lightfastness and ozonefastness.

The yellow ink composition preferably contains at least one type of compound expressed by the Formula Y-3 as a colorant, in order to have similar ozonefastness as the magenta ink composition and the cyan ink composition.

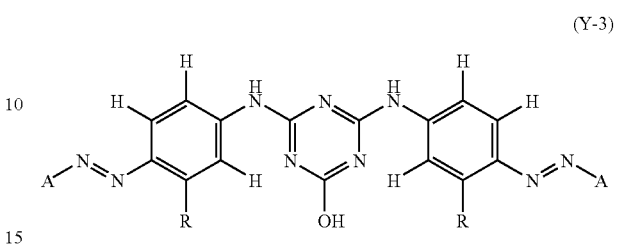

(Y-3)

(In the formula, R represents a methoxy group or a methyl group, and A represents 1,5-disulfonaphtho-3-yl or 1,5,7-trisulfonaphtho-2-yl.)

Furthermore, with the present invention, other yellow based dyes can also be used in order to adjust the color of the yellow ink composition, to the degree that the ozonefastness, lightfastness, and humidityfastness are not severely affected.

With the present invention, the concentration of color and included in the yellow ink composition can be suitably selected based on the color value of the compound (dye) used as the colorant, but the total amount of colorant in the yellow ink composition is preferably between 1.0 and 7.0 wt % based on the total weight of the yellow ink composition. Good chromic properties can be obtained if the concentration of the total amount of colorants included in the yellow ink composition is 1.0 wt % or higher, and characteristics such as nozzle spraying properties are the like which are required for the ink composition to be used with the inkjet recording method will be favorable and plugging of the ink nozzle can be prevented if the concentration of the total amount of colorant is 7.0 wt % or less.

Next, the colorant that is used in the black ink composition that is a part of the ink set of the present invention will be described.

The ink set of the present invention can also contain a black ink composition if desired. By including a black ink composition in the ink set of the present invention, an image with favorable contrast can be formed on the recording media.

The black ink composition contains a colorant expressed by the following Formula Bk-1 and if necessary, can also contain a surfactant, a permeation promoter, and other addi-

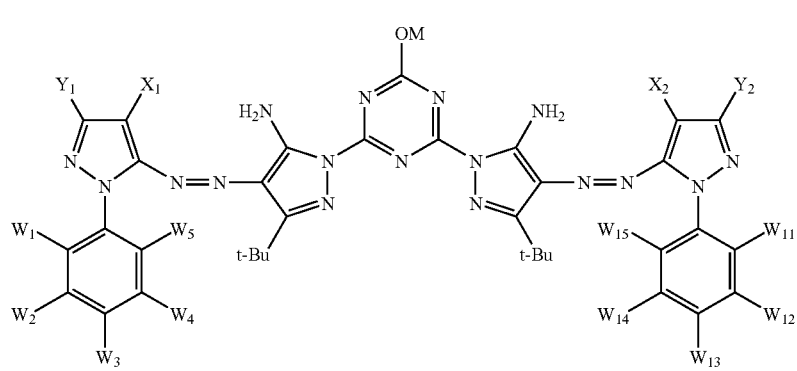

(Y-2)

(in the formula, $X_1$, $X_2$, $Y_1$, and $Y_2$ represent a hydrogen atom or a cyano group, $W_1$ through $W_5$ and $W_{11}$ through $W_{15}$ each represent a hydrogen atom, or a carboxyl group or salt thereof, M represents a metal atom, and t-Bu represent a tertiary butyl group.)

tives. Furthermore, the color and expressed by Formula Bk-1 can be used independently, or two or more types can be blended and used together.

$$A_1-N=N-A_2-N=N-A_3 \quad \text{(Bk-1)}$$

(In Formula. Bk-1, $A_1$ is a substitution group expressed by Formula Bk-2 or Bk-3, $A_2$ is a substitution group expressed by Formula Bk-4 or Bk-5, and $A_3$ is a substitution group expressed by Formula Bk-6.)

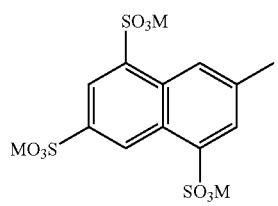
(Bk-2)

(in Formula Bk-2, M represents either lithium or sodium.)

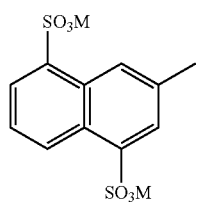
(Bk-3)

(in Formula Bk-3, M represents either lithium or sodium.)

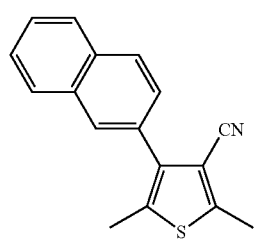
(Bk-4)

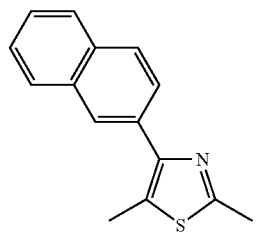
(Bk-5)

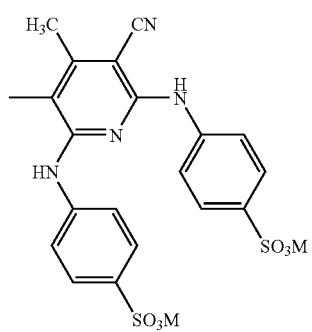
(Bk-6)

(in Formula Bk-6, M represents either lithium or sodium.)

Specific examples of colorants expressed by Formula Bk-1 include the colorants shown by the following Formula Bk-1-1, Formula Bk-1-2, Formula Bk-1-3, and Formula Bk-14 which are combinations where $A_1$ through $A_3$ in Formula Bk-1 are as shown in Table 1. One of these colorants can be used independently, or two or more types can be blended and used together.

TABLE 1

| | $A_1$ | $A_2$ | $A_3$ |
|---|---|---|---|
| FORMULA Bk-1-1 | 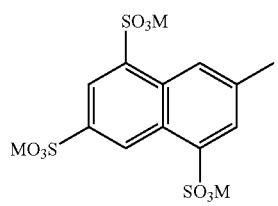 | 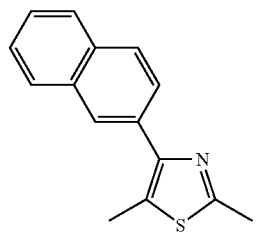 | 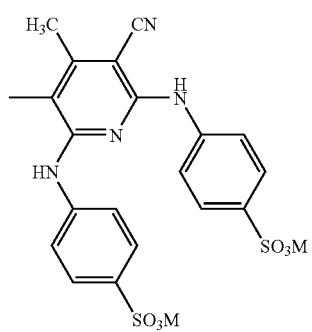 |

TABLE 1-continued

| | $A_1$ | $A_2$ | $A_3$ |
|---|---|---|---|
| FORMULA Bk-1-2 | | | |
| FORMULA Bk-1-3 | | | |
| FORMULA Bk-1-4 | | | |

In Table 1, M represents lithium or sodium.

Preferably, the black ink composition further contains a colorant expressed by Formula Bk-7, in order to improve the chromic properties (optical intensity) on a nonglossy media (matte paper or regular paper). The colorant expressed by Formula Bk-7 can be used independently, or two or more types can be blended and used together.

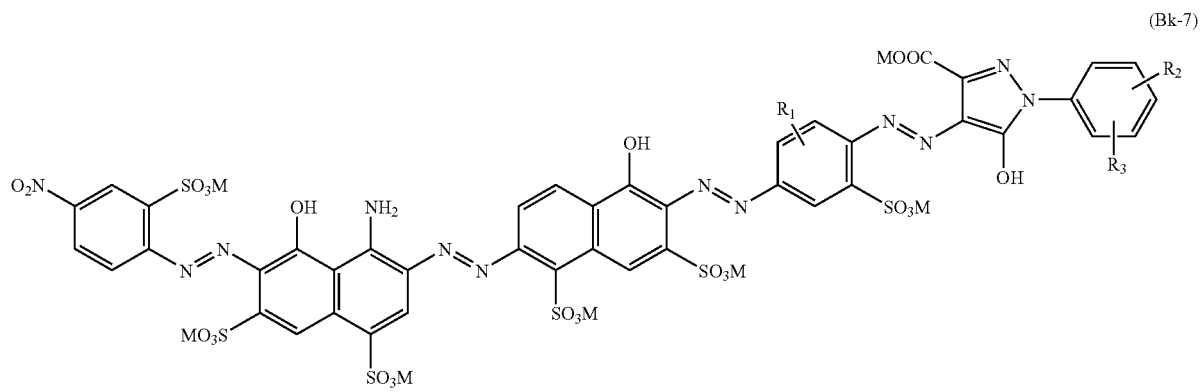
(Bk-7)

(in Formula Bk-7, $R_1$ represents a halogen atom, H, $SO_3M$, or COOM, $R_2$ and $R_3$ independently represent H, $SO_3M$, or COOM, and M represents either lithium or sodium. However, $R_2$ and $R_3$ are not both H.)

Specific examples of colorants expressed by Formula Bk-7 include the colorants shown by the following Formula Bk-7-1, Formula Bk-7-2, and Formula Bk-7-3. One of these colorants can be used independently, or two or more types can be blended and used together.

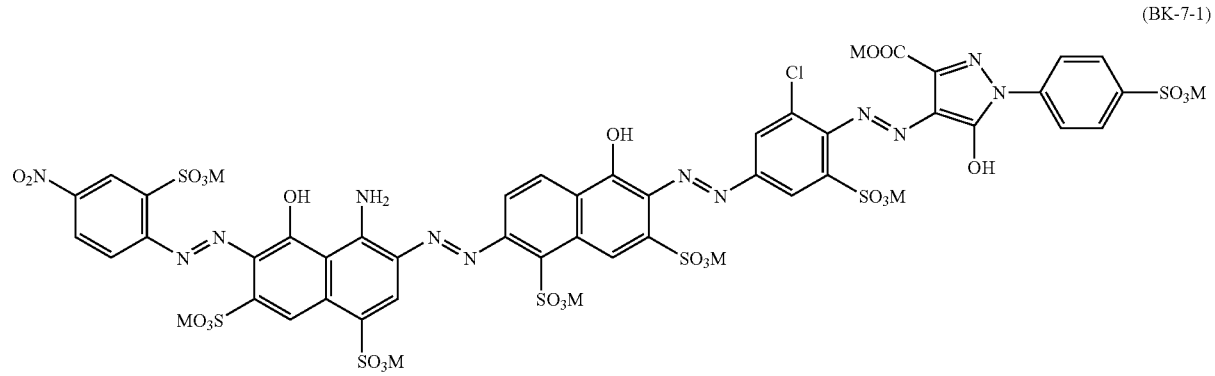

(BK-7-1)

(in Formula Bk-7-1, M represents either lithium or sodium. However, all cases of M are not sodium.)

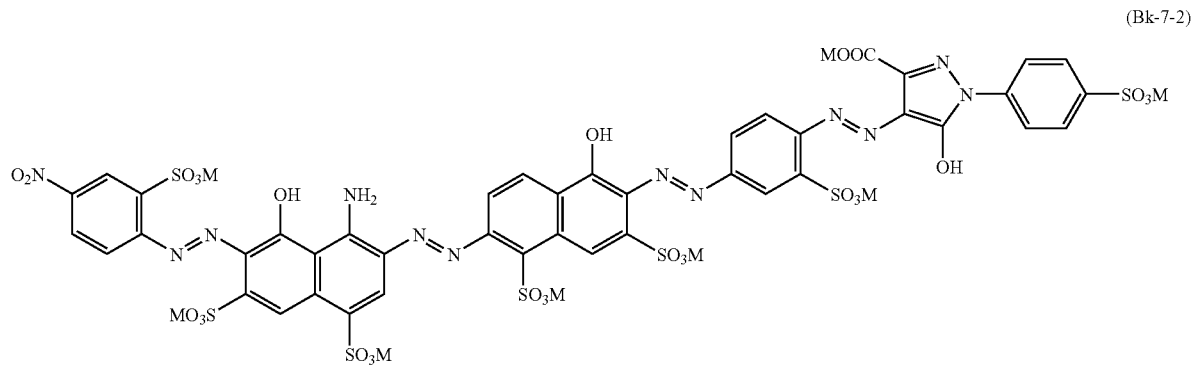

(Bk-7-2)

(in Formula Bk-7-2, M represents either lithium or sodium. However, all cases of M are not sodium.)

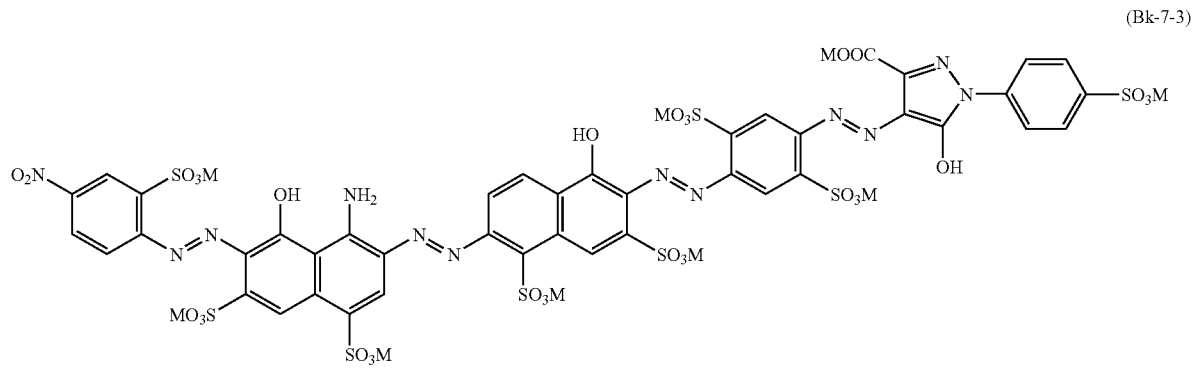

(Bk-7-3)

(in Formula Bk-7-3, M represents either lithium or sodium. However, all cases of M are not sodium.)

If the colorant expressed by Formula Bk-1 and the colorant expressed by Formula Bk-7 are used in combination, the formulation ratio of the colorant expressed by Formula Bk-1 and the colorant expressed by Formula Bk-7 is not particularly restricted, but is preferably between 2:1 and 1:2. Furthermore, if the formulation ratio of the colorant expressed by Formula Bk-1 is too high, the colors on a matte paper may be inferior, but if the formulation ratio of the colorant expressed by Formula Bk-7 is too high, ozonefastness may be inferior, and bronzing phenomenon can easily occur.

Furthermore, the total of the amount of colorant expressed by Formula Bk-1 and the amount of colorant expressed by Formula Bk-7 in the black ink composition is preferably between 5 and 8 wt %, and particularly between 5 and 7 wt %. Within this range, the chromic properties of the recorded image can be ensured, while the occurrence of bronzing phenomenon can be suppressed.

Furthermore, if a colorant expressed by Formula Adj-1 is added, the black ink composition will have an effect of suppressing bronzing phenomenon, and a black ink composition with a tone approaching achromatic color even at intermediate duty can be achieved.

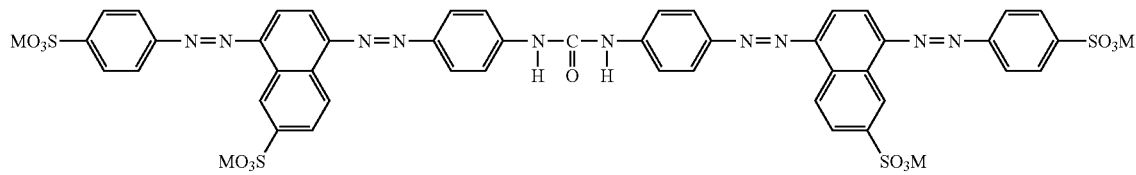
(Adj-1)

(in Formula Adj-1, M represents either lithium or sodium.)

Specific examples of the colorants expressed by Formula Adj-1 include the colorants shown by the following Formula Adj-1-1 and Formula Adj-1-2.

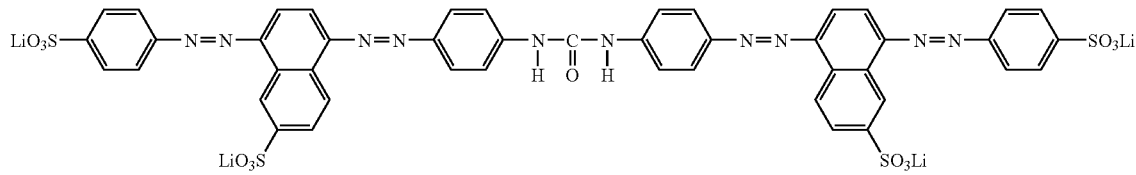
(Adj-1-1)

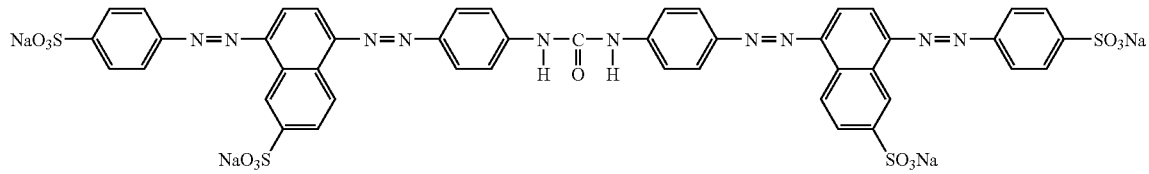
(Adj-1-2)

The weight ratio between the total formulation amount of colorant expressed by Formula Bk-1 and colorant expressed by Formula Bk-7 to the formulation amount of colorant expressed by Formula Adj-1 is preferably in a range between 4:1 and 7:1 from the viewpoint of ensuring color tone.

Furthermore, by adding C. I. Direct Yellow 86 in addition to the colorant expressed by Formula Adj-1, achieving a tone that approaches an achromatic color can be made easier and even more precise color tuning can be achieved as compared to when only the colorant expressed by Formula Adj-1 is added.

The weight ratio between the total formulation amount of colorant expressed by Formula Bk-1 and colorant expressed by Formula Bk-7 to the total formulation amount of colorant expressed by Formula Adj-1 and C. I. Direct Yellow 86 is preferably in a range between 3:1 and 5:1 from the viewpoint of ensuring color tone.

The colorants used in each of the ink compositions in the ink set of the present invention and the amount of colorants in the ink compositions was described above, but other components which are included in each of the ink compositions will be described below.

Each of the ink compositions of the present invention can be obtained by dissolving the aforementioned colorants (dyes) in an appropriate solvent. The solvent for dissolving the colorants in each of the aforementioned ink compositions preferably uses water or a blend of water and a water soluble organic solvent as the main solvent. The water can be ion exchange water, ultrafiltration water, reverse osmosis water, or distilled water or the like. Furthermore, using water which has been chemically sterilized by ultraviolet light irradiation or the addition of hydrogen peroxide is preferable from the viewpoint of long-term storage. The amount of water in each of the ink compositions that make up the ink set of the present invention is preferably in a range between 40 and 90 wt %, and more preferably in a range between 50 and 80 wt %.

As described above, each of the ink compositions of the present invention can use water and a water soluble organic solvent as a solvent medium. The water-soluble organic solvent is preferably a solvent that is capable of dissolving the dye, and preferably has a lower vapor pressure than pure water.

The water-soluble organic solvent that is used with the present invention is preferably ethylene glycol, propylene glycol, butanediol, pentanediol, 2-butene-1,4-diol, 2-methyl-2,4-pentanediol, glycerin, 1,2,6-hexanetriol, diethylene glycol, triethylene glycol, dipropylene glycol, and other polyhydric alcohols, acetonylacetone and other ketones, γ-butylolactone, triethyl phosphate and other esters, furfuryl alcohol, tetrahydrofurfuryl alcohol, or thiodiglycol or the like, but there is no restriction to these. By using water and a water soluble organic solvent as the solvent medium in the ink composition, the stability of discharging ink composition from the ink head can be improved, and the viscosity of the ink composition can easily be adjusted downward or the like while having almost no impact on other characteristics.

Furthermore, at least one type of moisture retaining agent selected from a sugar can be included in each of the ink compositions of the present invention. By including a moisture retaining agent in the ink composition, evaporation of the water content from the ink can be suppressed and the ink will be able to retain moisture when the ink composition is used with the inkjet recording method. The sugar which is used with the present invention is preferably maltitol, sorbitol, gluconolactone, or maltose or the like. Note, the aforementioned water soluble organic solvent also acts as a moisture retaining agent.

The total amount of water-soluble organic solvent and/or moisture retaining agent in the ink composition is preferably between 5 and 50 wt %, more preferably between 5 and 30 wt %, and even more preferably between 5 and 20 wt %. If the amounts thereof is 5 wt % or higher, and ink with good moisture retaining properties can be obtained, and if the amount is 50 wt % or less, the viscosity of the ink composition can be adjusted to a viscosity that is preferable for use with an inkjet recording method.

Other preferable additives which are added to the ink compositions that compose the ink set of the present invention will be described below.

The ink compositions that compose the ink set of the present invention preferably contain a nonionic surfactant. By adding a nonionic surfactant, the permeability of the ink composition into the recording media will be excellent, and during printing, the ink composition will quickly adhere to the recording media. Furthermore, each dot that is recorded by the ink composition on the recording media is preferably as round as possible, and the effects of increasing the roundness of the image formed by a single dot and improving the quality of the image obtained can be achieved if a nonionic surfactant is included in the ink composition.

The nonionic surfactant that can be used with the present invention is preferably an acetylene glycol based surfactant, but this is not a restriction. The acetylene glycol based surfactant that is used in the ink compositions of the present invention is preferably a compound expressed by the following Formula a-1:

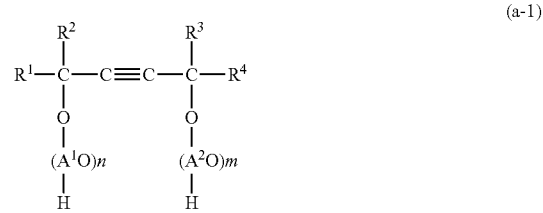

(a-1)

(in Formula a-1, $R^1$, $R^2$, $R^3$, and $R^4$ represents a straight chain, cyclic, or branched chain alkyl chain with between 1 and 6 carbons, and $A^1O$ and $A^2O$ each independently represent an oxyalkylene chain with between 2 and 3 carbons, such as oxyethylene or oxypropylene, or a polyoxyalkylene chain obtained by polymerizing or copolymerizing alkylene oxides with between 2 and 3 carbons, such as a polyoxyethylene chain, a polyoxypropylene chain, or a polyoxyethylenepropylene chain. Furthermore, in the formula, n and m represent the number of units of $A^1O$ or $A^2O$, or in other words the number of repeating oxyalkylene units, and are numbers that meet the conditions of $0 \leq n < 30$, $0 \leq m < 30$, and $0 \leq n+m < 50$.)

Examples of the acetylene glycol based surfactant include Surfinol 465 (trademark), Surfinol 104 (trademark) (product trade names, manufactured by Air Products and Chemicals Inc.), Olfin PD001 (trademark), Olfin E1010 (trademark) (product trade names, manufactured by Nissin Chemical Industry Co., Ltd.), and at least one type of surfactant selected therefrom is preferably added to the ink compositions that compose the ink set of the present invention.

With the present invention, the nonionic surfactant in the ink compositions should be added such that the amount of nonionic surfactant in the ink composition is preferably between 0.1 and 5 wt %, and more preferably between 0.5 and 2 wt %. By adding 0.1 wt % or more of a nonionic surfactant to the ink compositions, the permeability of each of the ink compositions into the recording media can be increased. By adding 5 a wt % or less of the nonionic surfactant to the ink compositions, bleeding of the image formed by the ink composition on the recording media can be suppressed.

Furthermore, by adding a glycol ether as a permeation enhancing agent to the ink composition in addition to the nonionic surfactant, permeation of the ink composition into the recording medium can be enhanced, while at the same time, bleeding of ink at the interface between adjacent color inks during color printing can be reduced and a very vivid image can be obtained. Therefore, a permeation enhancing agent is preferably added to the ink compositions that compose the ink set of the present invention.

Examples of the aforementioned glycol ethers which are preferably used as a permeation enhancing agent include ethylene glycol monobutyl ether, diethylene glycol monobutyl ether, triethylene glycol monoethyl ether, propylene glycol dimethyl ether, dipropylene glycol monoethyl ether, propylene glycol monobutyl ether, dipropylene glycol monobutyl ether, triethylene glycol monobutyl ether, and the like, but there is no restriction to these. The amount of these glycol ethers in the ink composition is preferably between 3 and 30 wt %, and more preferably between 5 and 15 wt %. By adding 3 wt % or more of a glycol ether, bleeding between adjacent inks during color printing can effectively be prevented, and by adding 30 wt % or less, smearing of the image can easily be prevented, and the storage stability of the ink can be improved.

Furthermore, other materials selected from a pH adjusting agent such as triethanolamine or an alkali metal hydroxide, water-soluble polymer such as sodium alginate, a water soluble resin, a fluoride based surfactant, a preservative, an antifungal agent, a rust inhibitor, a dissolving aid, an antioxidant, and an ultraviolet light absorber and the like can also be added if desired to the ink composition of the present invention. These components can be used individually, or as a blend of two or more. Furthermore, these components do not need to be added if there is no need. A person skilled in the art can use a preferred amount of a selected additive to the extent that the effect of the present invention is not hindered. Note, the aforementioned dissolving aid is an additive for dissolving insoluble materials and maintaining the ink composition in a uniform solution, when an insoluble material is deposited from the ink composition.

Examples of the dissolving aid include N-methyl-2-pyrrolidone, 2-pyrrolidone and other pyrrolidones, urea, thiourea, tetramethyl urea, and other ureas, allophanate, methylallophanate and other allophanates, biuret, dimethylbiuret, tetramethylbiuret, and other biurets, and the like, but the present invention is not restricted to these. Furthermore, an example of the aforementioned antioxidants includes L-ascorbic acid or salt thereof, but there is no restriction to these.

Examples of the aforementioned preservatives and antifungal agents include sodium benzoate, sodium pentachlorophenol, sodium 2-pyridinethiol-1-oxide, sodium sorbitate, sodium dehyroacetate, and 1,2-dibenzothiazoline-3-one (Proxel CRL, Proxel BDN, Proxel GXL, Proxel XL-2, and Proxel TN (all product names) manufactured by AVECIA Biologics, Ltd.), and the like, but there is no restriction to these.

Examples of the aforementioned pH adjusting agent include amines and derivatives thereof such as diethanolamine, triethanolamine, propanolamine, and morpholine; metal hydroxides such as potassium hydroxide, sodium hydroxide, and lithium hydroxide; ammonium salts such as ammonium hydroxide, quaternary ammonium hydroxide (such as tetramethyl ammonium and the like); carbonates such as potassium carbonate, sodium carbonate, and lithium carbonate; as well as other phosphates and the like, but there is no restriction to these.

The ink set compositions that compose the ink set of the present invention are prepared using appropriately selected components from the aforementioned components, and the viscosity of the ink composition obtained is preferably less than 10 mPa·s at 20° C. Furthermore, with the present invention, the surface tension of the ink composition is preferably 45 mN/m or less at 20° C., and a range between 25 and 45 mN/m is particularly preferable. By adjusting the viscosity and the surface tension in this manner, an ink composition with favorable properties for use with an ink jet recording method can be obtained. Adjusting the viscosity and the surface tension can be performed by appropriately selecting and adjusting the amount of solvent and the amount of each type of additive included in the ink composition, as well as the types of additives and solvents and the like which are added.

Note, the ink compositions which compose the ink set of the present invention preferably have a pH at 20° C. that is between 7.0 and 10.5, more preferably between 7.5 and 10.0. By maintaining the pH of the ink composition at 20° C. at 7.0 or higher, peeling of the plating codeposited on the inkjet head can be prevented, and the spray characteristics of the ink composition from the inkjet head can be stabilized. Furthermore, by maintaining the pH of the ink composition at 20° C. at 10.5 or lower, degradation of the various types of materials that contact with the ink composition such as the materials that make up the ink cartridge and the inkjet head, can be prevented.

The method of preparing the ink composition of the present invention is for example a method of sufficiently blending the various types of components that will be included in the ink composition, and dissolving to be as uniform as possible, and then pressure filtering using a membrane filter with a pore size of 0.8 μm, and then degassing the solution obtained using a vacuum pump, but this is not a restriction.

Next, the ink set of the present invention containing the aforementioned ink compositions can be used in an ink cartridge that integrally or independently stores the ink set, and this is preferable from the viewpoint of handling convenience. The ink cartridge that contains the ink set is commonly known in this field of technology, and the ink cartridge can be made by appropriately using commonly known methods.

The ink set and the ink cartridge of the present invention can be used for general writing tools, recorders, and pen plotters and the like, but is most preferably used with an inkjet recording method. The inkjet recording method that can use the ink set or ink cartridge of the present invention also includes any recording method where the ink composition is sprayed as liquid droplets from a fine nozzle, and the liquid droplets are made to adhere to the recording media. Specific examples of inkjet recording methods that can use the ink composition of the present invention will be described below.

The first method is a method known as the electrostatic suction method. The electrostatic section method is a method of recording an image by applying an electric field between a nozzle and an acceleration electrode located to the front of the nozzle, continuously spraying liquid droplets of ink from the nozzle, and applying a printing information signal to a deflecting electrode while the ink droplets are passing between the deflecting electrode, and thereby the ink droplets will travel toward the recording media and the inch will adhere to the recording media, or a method where the ink droplets are sprayed from a nozzle toward the recording media according to a print information signal without deflecting the ink droplets. The ink set or ink cartridge of the present invention is preferably used with the electrostatic suction recording method.

A second method is a method of forcefully spraying ink droplets from an inkjet nozzle by mechanically vibrating the nozzle using a water crystal oscillator while applying pressure on the ink solution using a small pump. The ink droplets sprayed from the nozzle are electrically charged while being sprayed, and a printing information signal is provided to a deflecting electrode while the ink droplets pass between the deflecting electrodes, and thereby an image is recorded on the recording media. The ink set or ink cartridge of the present invention is preferably used with this recording method.

A third method is a method of recording an image on a recording media by simultaneously applying pressure and a printing information signal to a ink solution using a piezoelectric element, and spraying the ink droplets from the nozzle towards the recording media. The ink set or ink cartridge of the present invention is preferably used with this recording method.

A fourth method is a method of recording an image on recording media by heating and causing the ink solution to bubble using ultrafine electrodes in accordance with printing signal information, and then spraying the ink from the nozzle toward the recording media by the expansion of the bubbles. The ink set or ink cartridge of the present invention is preferably used with this recording method.

The ink set and the ink cartridge of the present invention most preferably use the ink compositions when recording images on a recording media using an image recording method including the four aforementioned inkjet recording systems. Recorded matter that records an image using the ink set or ink cartridge of the present invention will have excellent image quality, and the lightfastness, ozonefastness, and humidityfastness will be excellent.

Embodiments

The present invention will be described below more specifically based on embodiments, but the present invention is not restricted to the following embodiments.

Preparation of Each Ink Composition

Each of the ink compositions was obtained by blending the various components based on the formulations shown in the following Table 2, mixing for 30 minutes at room temperature, and then filtering the solution obtained through a membrane filter with a mesh size of 1.0 μm. Note, in Table 2, the values for each component are expressed as weight % of each component based on 100% of the mass of the ink composition, and the amount of water is shown as "Bal.", meaning the amount of water that combined with the other components besides water will total 100

TABLE 2

|  | C-01 | C-02 | C-11 | C-12 | M-01 | M-02 | M-03 | M-11 | M-12 | M-13 | M-14 | Y-01 | Y-11 | Y-12 | Y-13 | K-01 | K-11 | K-12 | K-13 |
|---|---|---|---|---|---|---|---|---|---|---|---|---|---|---|---|---|---|---|---|
| Cyan Dye 1 |  |  | 5 | 5 |  |  |  |  |  |  |  |  |  |  |  |  |  |  |  |
| C.I. Direct Blue 199 | 3.5 | 5 |  |  |  |  |  |  |  |  |  |  |  |  |  |  |  |  |  |
| Magenta Dye 1 |  |  |  |  |  |  |  | 5 | 5 | 5 | 3 |  |  |  |  |  |  |  |  |
| Magenta Dye 2 |  |  |  |  |  |  |  | 1 |  |  |  |  |  |  |  |  |  |  |  |
| Magenta Dye 3 |  |  |  |  |  | 3.5 |  |  | 1 | 1 | 2 |  |  |  |  |  |  |  |  |
| Magenta Dye 4 |  |  |  |  |  |  | 5.5 |  |  |  |  |  |  |  |  |  |  |  |  |
| C.I. Direct Red 227 |  |  |  | 3 |  |  |  |  |  |  |  |  |  |  |  |  |  |  |  |
| Yellow |  |  |  |  |  |  |  |  |  |  |  | 5 | 3.5 | 2.5 |  |  |  |  |  |

TABLE 2-continued

| | C-01 | C-02 | C-11 | C-12 | M-01 | M-02 | M-03 | M-11 | M-12 | M-13 | M-14 | Y-01 | Y-11 | Y-12 | Y-13 | K-01 | K-11 | K-12 | K-13 |
|---|---|---|---|---|---|---|---|---|---|---|---|---|---|---|---|---|---|---|---|
| Dye 1 Yellow | | | | | | | | | | | | | | 1.5 | 2.5 | | | | |
| Dye 2 Yellow | | | | | | | | | | | | | | | | | | | 1 |
| Dye 3 C.I. Direct Yellow 173 | | | | | | | | | | | | | 3 | | | | | | |
| C.I. Direct Yellow 86 | | | | | | | | | | | | | 0.8 | | | | | | 0.4 |
| Black Dye 1 | | | | | | | | | | | | | | | | 6 | 3 | 3 | |
| Black Dye 2 | | | | | | | | | | | | | | | | | | 3 | 3 |
| C.I. Direct Black 195 | | | | | | | | | | | | | | | 6 | | | | |
| Glycerin | 10 | 5 | 10 | 5 | 10 | 9 | 10 | 10 | 9 | 8 | 8 | 10 | 10 | 10 | 10 | 9 | 9 | 9 | 9 |
| Triethylene glycol | 8 | 14 | 8 | 14 | 6 | 6 | 6 | 6 | 6 | 6 | 6 | 10 | 10 | 10 | 10 | 2 | 2 | 2 | 2 |
| 1,2-hexanediol | | 1 | | 1 | | | | | | 2 | 4 | | | | | | 2 | 2 | 2 |
| TEGmBE | 10 | 9 | 10 | 9 | 10 | 9 | 10 | 10 | 9 | 9 | 9 | 5 | 10 | 10 | 10 | | 8 | 8 | 8 |
| DEGmBE | | | | | | | | | | | | 5 | | | | 10 | | | |
| Olfin E1010 (*1) | 1 | | 1 | | | | | | | | | | | | | | | | |
| Surfinol 104PG50 (*2) | | 1 | | 1 | 1 | 1 | 1 | 1 | 1 | 1 | 1 | 1 | 1 | 1 | 1 | 1 | 1 | 1 | 1 |
| Surfinol MD20 (*2) | | | | | | | | | | 0.2 | 0.2 | | | | | | | | |
| 2-pyrolidone | | | | 2 | 2 | 2 | 2 | 2 | 2 | 2 | 2 | | | | | | 3 | 3 | 3 |
| Urea | | | | | 5 | | | | | 5 | 5 | | | | | | | | |
| Triethanolamine | 0.5 | 0.5 | 0.5 | 0.5 | 0.5 | 0.5 | 0.5 | 0.5 | 0.5 | 0.5 | 0.5 | | 0.1 | 0.1 | 0.1 | 0.5 | 0.5 | 0.5 | 0.5 |
| LiOH monohydrate | | 0.7 | | 0.7 | | | | | | | | | | | | | | | |
| 2-nathoic acid | | 2 | | 2 | | | | | | | | | | | | | | | |
| Compound 1 | | | | | | | | | | 1 | 2 | | | | | | | | |
| EDTA | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 | 0.02 |
| Benotriazole | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 | 0.01 |
| Proxel XL-2 (*3) | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Water | Bal. | Bal. | Bal. | Bal. | Bal. | Bal. | Bal. | Bal. | Bal. | Bal. | Bal. | Bal. | Bal. | Bal. | Bal. | Bal. | Bal. | Bal. | Bal. |

*1: Product of Nissin Chemical Industry Co., Ltd.
*2: Product of Air Products and Chemicals, Inc.
*3: Product of Arch Chemicals Japan
Units: weight %

Furthermore, in Table 2, C represents cyan ink composition, M represents magenta ink composition, Y represents yellow ink composition, and K represents black ink composition.

In Table 2, Cyan Dye 1 is an example of the compound expressed by Formula C-1, and is the compound expressed by Formula A:

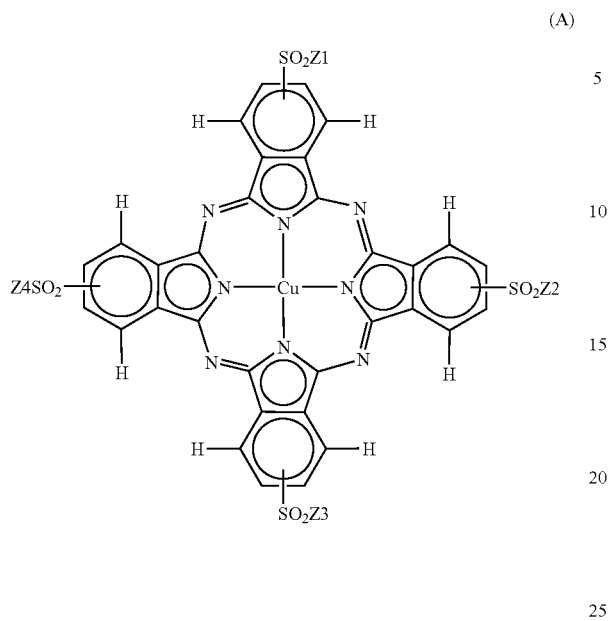

(A)

and Z1 through Z4 in Cyan Dye 1 are as shown below in Table 3.

TABLE 3

| | Z1 | Z2 | Z3 | Z4 |
|---|---|---|---|---|
| Cyan Dye 1 | —(CH$_2$)$_3$SO$_3$Li | —(CH$_2$)$_3$SO$_3$Li | —(CH$_2$)$_3$SO$_3$Li | —(CH$_2$)$_3$SO$_2$NHCH$_2$CH(OH)CH$_3$ |

The cyan dyes that are used other than the compound expressed by Formula C-1 which is the cyan dye according to the present invention were C. I. Direct Blue 199.

In Table 2, Magenta Dye 1 is an example of a compound expressed by Formula M-2, and is the compound expressed by Formula B:

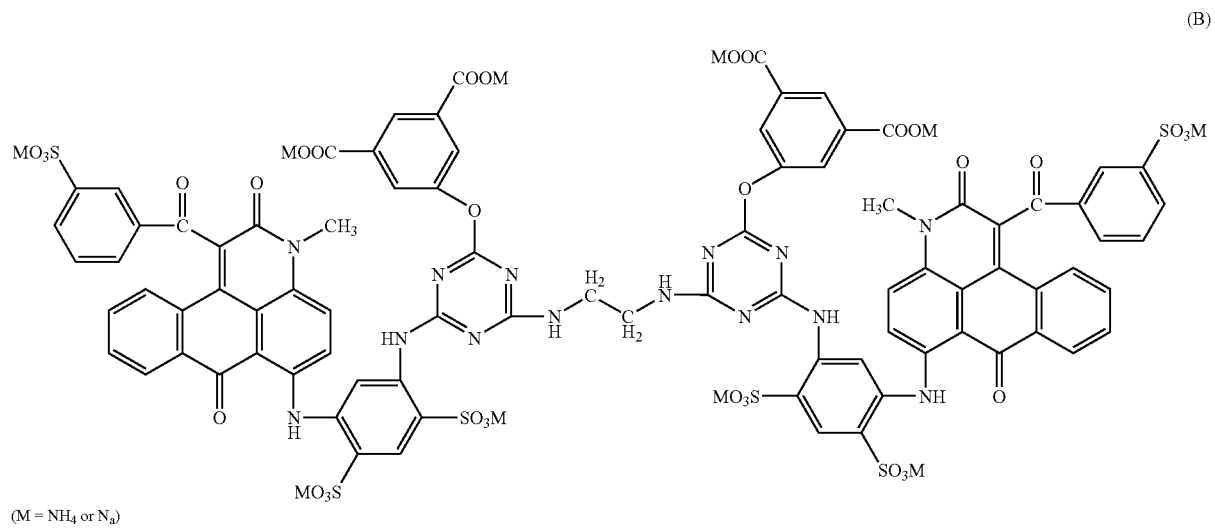

(B)

(M = NH$_4$ or Na)

Note, in Formula B, M represents $NH_4$ or Na, and the molar ratio of $NH_4$:Na=1:1.

Furthermore, Magenta Dye 2 is an example of a compound expressed by Formula M-1, and is the compound expressed by Formula C:

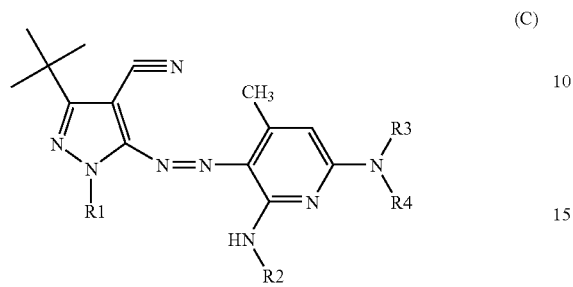

(C)

and $R_1$ through $R_4$ in Magenta Dye 2 correspond to the groups shown below.

TABLE 4

| $R_1$ | $R_2$ | $R_3$ | $R_4$ |
|---|---|---|---|
| benzothiazole-$SO_3K$ | trimethylphenyl-$SO_3K$ | benzothiazole-$SO_2K$ | trimethylphenyl-$SO_2K$ |

Furthermore, Magenta Dye 3 is an example of a compound expressed by Formula M-4, and is the compound expressed by Formula D:

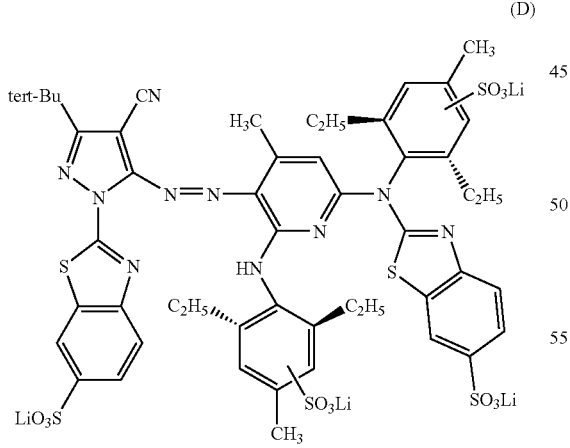

(D)

In addition, the magenta dyes that were used other than the compound expressed by Formulas M-1 and M-2 which are the magenta dyes according to the present invention were C. I. Direct Red 227 and the compound expressed by Formula E.

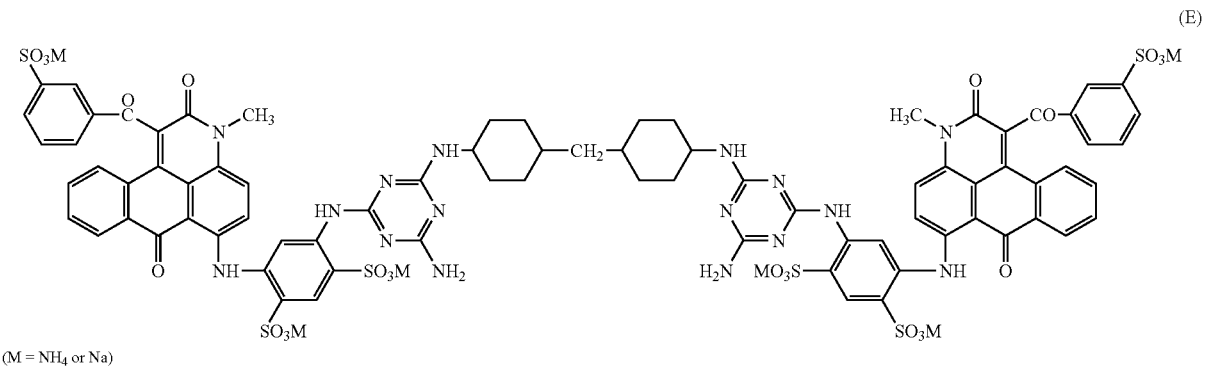

(M = NH₄ or Na)

Note, in Formula E, M represents $NH_4$ or Na, and the molar ratio of $NH_4:Na=1:1$.

In Table 2, Yellow Dye 1 is an example of a compound expressed by Formula Y-2, and is the compound expressed by Formula F:

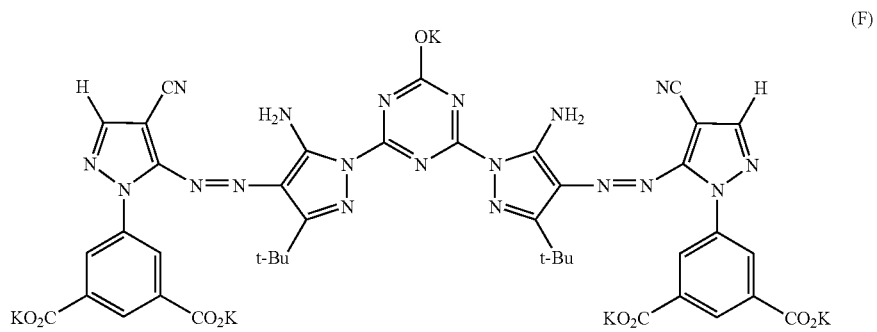

Furthermore, Yellow Dye 2 is an example of a compound expressed by Formula Y-3, and is the compound expressed by Formula G:

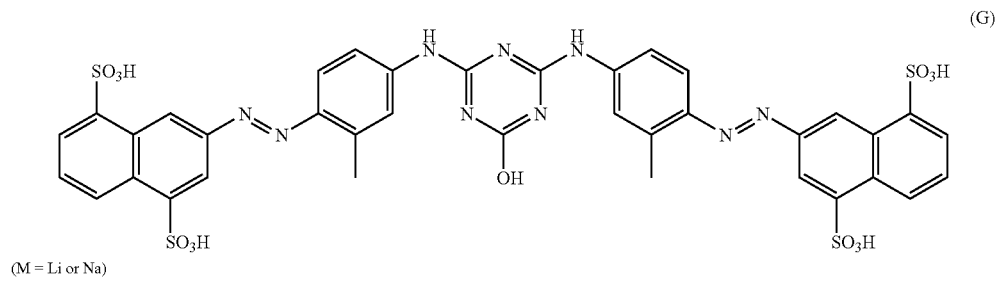

(M = Li or Na)

wherein M represents lithium or sodium, and the molar ratio of Li:Na=4:1.

In addition, the yellow dyes that were used other than the compound expressed by Formula Y-1 which is the yellow dye according to the present invention were C. I. Direct Yellow 173, and C. I. Direct Yellow 86.

In Table 2, Black Dye 1 is an example of a compound expressed by Formula Bk-1, and is the compound expressed by Formula H, and $A_1$ to $A_3$ in Black Dye 1 are respectively a group shown below:

TABLE 5

| $A_1$ | $A_2$ | $A_3$ |
|---|---|---|
|  | | |

Furthermore, Black Dye 2 is an example of a compound expressed by Formula Bk-7, and is the compound expressed by Formula I:

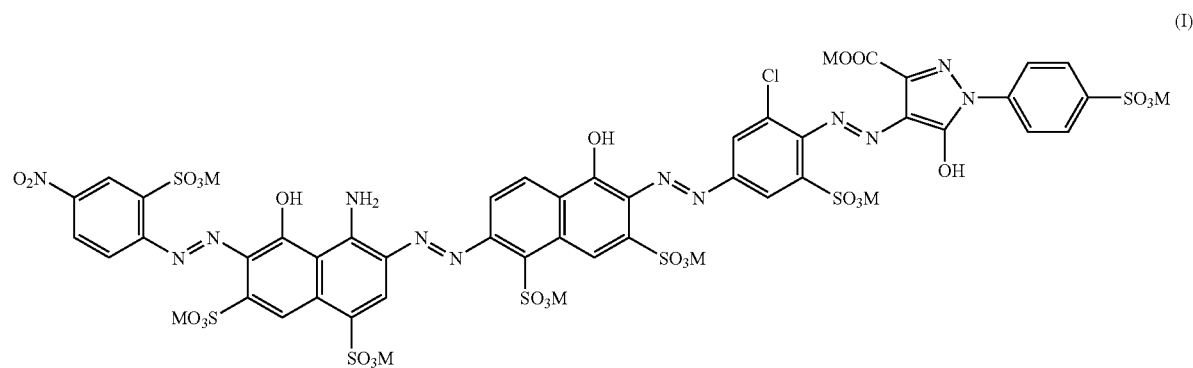

wherein M represents either lithium or sodium. However, all cases of M are not sodium.

Furthermore, the black dyes that were used other than the compounds expressed by Formulas Bk-1 and Bk-7 which are the black dyes according to an exemplary embodiment of the present invention, were C. I. Direct Black 195.

In addition, dyes for color matching the black ink composition include C. I. Direct Yellow 86 and Yellow dye 3, the compound expressed by Formula J:

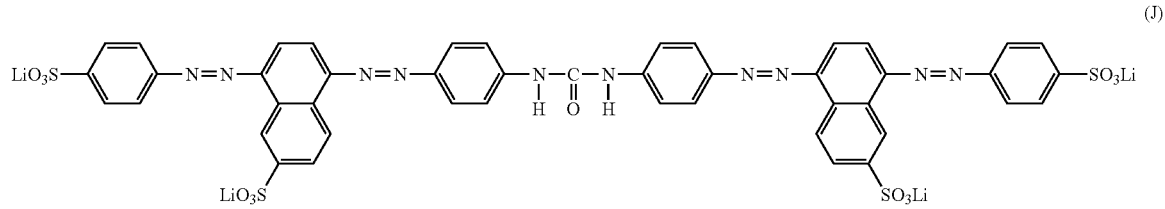

(Comparable to the Compound Expressed by Formula Adj-1-1)

Furthermore, the magenta ink composition in the ink set according to the exemplary embodiment of the present invention contains compound 1 expressed by Formula K:

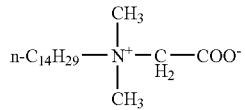

(K)

(Comparable to the Compound Expressed by Formula B-3)

Next, each of the ink sets from Embodiment 1 through 7 and Comparative Examples 1 through 8 were prepared using each of the ink compositions prepared in the combinations shown in Table 6.

TABLE 6

|  | Cyan | Magenta | Yellow | Black |
|---|---|---|---|---|
| Embodiment 1 | C-11 | M-11 | Y-11 | — |
| Embodiment 2 | C-12 | M-12 | Y-13 | — |
| Embodiment 3 | C-11 | M-13 | Y-12 | — |
| Embodiment 4 | C-12 | M-14 | Y-12 | — |
| Embodiment 5 | C-11 | M-13 | Y-13 | K-12 |
| Embodiment 6 | C-12 | M-13 | Y-12 | K-13 |
| Embodiment 7 | C-12 | M-14 | Y-11 | K-11 |
| Comparative Example 1 | C-01 | M-01 | Y-01 | — |
| Comparative Example 2 | C-02 | M-11 | Y-12 | — |
| Comparative Example 3 | C-11 | M-01 | Y-12 | — |
| Comparative Example 4 | C-12 | M-12 | Y-01 | — |
| Comparative Example 5 | C-12 | M-02 | Y-11 | — |
| Comparative Example 6 | C-11 | M-03 | Y-01 | — |
| Comparative Example 7 | C-01 | M-01 | Y-13 | K-01 |
| Comparative Example 8 | C-02 | M-13 | Y-01 | K-13 |

Recorded matter was prepared by printing a filled image consisting of yellow, magenta, cyan, and black (However black was only included for the ink sets which include black.) adjusted so that the outer diameter of each color was between 0.9 and 1.1, on special inkjet recording media <photograph paper (glossy): part number KA420PSK; product name, manufactured by Seiko Epson Corp.> using the ink set shown in Table 6 and an inkjet printer PM-A700 (registered trademark) (product name, manufactured by Seiko Epson Corp.). The following ozonefastness test was performed on the printed matter obtained.

Ozonefastness Test Method

The recorded matter was exposed to ozone at a concentration of 20 ppm at 24° C. and 60% RH using an ozone weath-o-meter model OMS-H (product name, manufactured by Suga Test Instruments Co., Ltd.). The outer diameter of each color recorded on the printed matter was measured at set time intervals from the start of exposure using an intensity meter (Spectrolino (registered trademark), manufactured by Gretag Corp.). The measurement conditions were a light source of D50, and a viewing angle of 2°. Furthermore, measurements were taken using a red filter for cyan, a green filter for magenta, and a blue filter for yellow, and no filter was used for black. The residual optical density (ROD) was determined from the results obtained using the following equation:

ROD (%)=$(D/D_0)\times 100$ (In the formula, D is the outer diameter value after exposure testing and $D_0$ is the outer diameter value before exposure testing.)

Furthermore, based on the results of the above test, the ozonefastness for each color recorded on the recorded matter was ranked A to F using the following judgment criteria.

Judgment Criteria

Level A: ROD does not drop below 70% after 40 hours.

Level B: ROD drops to 70% after 32 hours but less than 40 hours.

Level C: ROD drops to 70% after 24 hours but less than 32 hours.

Level D: ROD drops to 70% after 16 hours but less than 24 hours.

Level E: ROD drops to 70% after 8 hours but less than 16 hours.

Level F: ROD drops to 70% in less than 8 hours.

With the present invention, the reduction in the ROD of the recorded matter was minimal even after long term exposure to ozone. The results obtained are shown in Table 7.

From the results of the ozonefastness test for each color, the ozonefastness of each of the color sets was ranked using the following judgment criteria.

Judgment Criteria

Level A: The ozonefastness test results were at Level A for all three colors (four colors if black is included).

Level B: The ozonefastness test results were at Level B for at least one ink of the three colors (four colors if black is included).

Level C: The ozonefastness test results were at Level C for at least one ink of the three colors (four colors if black is included).

Level D: The ozonefastness test results were at Level D for at least one ink of the three colors (four colors if black is included).

Level E: The ozonefastness test results were at Level E for at least one ink of the three colors (four colors if black is included).

Level F: The ozonefastness test results were at Level F for at least one ink of the three colors (four colors if black is included).

In this evaluation, rank A was the best, followed by rank B. The results obtained are shown as the "Ozonefastness of Ink Set" in Table 7.

Furthermore, the difference (balance) in the changes of ROD for each color of the printed matter caused by exposure to ozone was evaluated for each recorded matter using the following judgment criteria for each ink set.

Judgment Criteria

Rank A: The difference between the maximum value and the minimum value for the ROD of each color (hereinafter referred to as the "ROD difference" in the discussion of this evaluation method) was less than 15 points even after 40 hours from the start of testing.

Rank B: The ROD difference was 15 points between 32 hours and 40 hours after the start of testing.

Rank C: The ROD difference was 15 points between 24 hours and 32 hours after the start of testing.

Rank D: The ROD difference was 15 points between 16 hours and 24 hours after the start of testing.

Rank E: The ROD difference was 15 points between 8 hours and 16 hours after the start of testing.

Rank F: The ROD difference was 15 points within 8 hours from the start of testing.

In this evaluation, recorded matter which had a small ROD difference was superior. The evaluation results obtained are shown as "Ozonefastness (Color Balance) of the Ink Set" in Table 7.

TABLE 7

|  | Lightfastness of Individual Colors | | | | Lightfastness of Ink Set | |
|---|---|---|---|---|---|---|
|  | Cyan | Magenta | Yellow | Black | Lightfastness | Color Balance |
| Embodiment 1 | B | C | A | — | C | C |
| Embodiment 2 | B | C | C | — | C | B |
| Embodiment 3 | B | B | B | — | B | A |
| Embodiment 4 | B | A | B | — | B | B |
| Embodiment 5 | B | B | C | B | C | B |
| Embodiment 6 | B | B | B | B | B | A |
| Embodiment 7 | B | A | A | A | B | B |
| Comparative Example 1 | F | F | A | — | F | F |
| Comparative Example 2 | F | C | B | — | F | F |
| Comparative Example 3 | B | F | B | — | F | F |
| Comparative Example 4 | B | C | A | — | C | C |
| Comparative Example 5 | B | C | A | — | C | C |
| Comparative Example 6 | B | D | A | — | D | D |
| Comparative Example 7 | F | F | C | F | F | F |
| Comparative Example 8 | F | B | A | B | F | F |

Fluorescent Lightfastness Test Method

The recorded matter used for the ozonefastness test was re-created for the ink set shown in Table 6, and the recorded matter was exposed using a fluorescent lightfastness tester model SFT-III (product name, manufactured by Suga Test Instruments Co. Ltd.) at 24° C. and 60% RH with an intensity of 70,000 lux. The outer diameter of each color recorded on the printed matter was measured at set time intervals from the start of exposure using an intensity meter (Spectrolino (registered trademark), manufactured by Gretag Corp.) The measurement conditions were a light source of D50, and a viewing angle of 2°. Furthermore, measurements were taken using a red filter for cyan, a green filter for magenta, and a blue filter for yellow, and no filter was used for black. The residual optical density (ROD) was determined from the results obtained using the following equation:

$$ROD\ (\%) = (D/D_0) \times 100$$

(In the formula, D is the outer diameter value after exposure testing and $D_0$ is the outer diameter value before exposure testing.)

Furthermore, based on the results of the above test, the lightfastness for each color recorded on the recorded matter was ranked A to F using the following judgment criteria.

Judgment Criteria

Rank A: ROD does not drop to 70% after 70 days.

Rank B: ROD drops to 70% after 50 days but less than or equal to 70 days.

Rank C: ROD drops to 70% after 30 days but less than or equal to 50 days.

Rank D: ROD drops to 70% after 20 days but less than or equal to 30 days.

Rank E: ROD drops to 70% after 10 days but less than or equal to 20 days.

Rank F: ROD drops to 70% in less than or equal to 10 days.

With the present invention, the reduction in the ROD of the recorded matter was minimal even after long term exposure to fluorescent. The results obtained are shown in Table 8.

From the results of the fluorescent lightfastness test for each color, the lightfastness of each of the color sets was ranked using the following judgment criteria.

Judgment Criteria

Rank A: The lightfastness test results were at Rank A for all three colors (four colors if black is included).

Rank B: One or more of the 3 color inks (four colors inks if black is included) had lightfastness test results at Rank B.

Rank C: One or more of the 3 color inks (four colors inks if black is included) had lightfastness test results at Rank C.

Rank D: One or more of the 3 color inks (four colors inks if black is included) had lightfastness test results at Rank D.

Rank E: One or more of the 3 color inks (four colors inks if black is included) had lightfastness test results at Rank E.

Rank F: One or more of the 3 color inks (four colors inks if black is included) had lightfastness test results at Rank F.

In this evaluation, rank A was the best, followed by rank B. The results obtained are shown as the "Lightfastness of Ink Set (Lightfastness)" in Table 8.

Furthermore, the difference (balance) in the changes of ROD for each color of the printed matter caused by exposure to fluorescent was evaluated for each recorded matter using the following judgment criteria for each ink set.

Judgment Criteria

Rank A: The difference between the maximum value and the minimum value for the ROD of each color (hereinafter referred to as the "ROD difference" in the discussion of this evaluation method) was less than 15 points even after 70 days from the start of testing.

Rank B: The ROD difference was 15 points between 50 days and 70 days after the start of testing.

Rank C: The ROD difference was 15 points between 30 days and 50 days after the start of testing.

Rank D: The ROD difference was 15 points between 20 days and 30 days after the start of testing.

Rank E: The ROD difference was 15 points between 10 days and 20 days after the start of testing.

Rank F: The ROD difference was 15 points within 10 days from the start of testing.

In this evaluation, recorded matter which had a small ROD difference was superior. The evaluation results obtained are shown as "Lightfastness (Color Balance) of the Ink Set" in Table 8.

TABLE 8

|  | Lightfastness of Individual Colors | | | | Lightfastness of Ink Set | |
|---|---|---|---|---|---|---|
|  | Cyan | Magenta | Yellow | Black | Lightfastness | Color Balance |
| Embodiment 1 | A | C | A | — | C | C |
| Embodiment 2 | A | C | C | — | C | C |

TABLE 8-continued

|  | Lightfastness of Individual Colors | | | | Lightfastness of Ink Set | |
|---|---|---|---|---|---|---|
|  | Cyan | Magenta | Yellow | Black | Lightfast-ness | Color Balance |
| Embodiment 3 | A | B | B | — | B | B |
| Embodiment 4 | A | A | B | — | B | B |
| Embodiment 5 | A | B | C | B | C | C |
| Embodiment 6 | A | B | B | B | B | B |
| Embodiment 7 | A | A | A | A | A | A |
| Comparative Example 1 | A | F | E | — | F | F |
| Comparative Example 2 | A | C | B | — | C | C |
| Comparative Example 3 | A | F | B | — | F | F |
| Comparative Example 4 | A | C | E | — | E | C |
| Comparative Example 5 | A | B | A | — | B | B |
| Comparative Example 6 | A | E | E | — | E | E |
| Comparative Example 7 | A | F | C | E | F | F |
| Comparative Example 8 | A | B | E | B | E | E |

Humidityfastness Evaluation

Colored text and white text on color (text formed in white on a filled image of each color) for each color of the ink cyan, magenta, yellow, and black (However black is only included for ink sets which include black.) was printed for the ink sets of embodiments 1 through 7 and comparative examples 1 through 8 on special inkjet recording media <photograph paper (glossy): part number KA420PSK; product name, manufactured by Seiko Epson Corp.>, and dried for 24 hours at 24° C. and 50% RH. Next the recorded media was placed in an environment away from direct sunlight at 35° C. and 85% RH. After setting for 4 days in this environment, the level of bleeding of the text and the white text were visually observed, and an evaluation was made based on the following judgment criteria.

Judgment Criteria

Rank A: Absolutely no bleeding of the colorant was observed.

Rank B: Almost no bleeding of the colorant was observed.

Rank C: Slight bleeding of the colorant was observed, and the contour of the text was slightly damaged.

Rank D: Bleeding of the colorant was observed, and the contour of the text was damaged.

Rank E: Bleeding of the colorant was observed, the text was thicker, and the white on color text was generally stained.

Rank F: Severe bleeding of the colorant was observed, and both the text and the white on color text were illegible.

The results obtained are shown in Table 9 as "humidityfastness".

TABLE 9

|  | Humidityfastness of Individual Colors | | | | Humidityfastness of Ink Set |
|---|---|---|---|---|---|
|  | Cyan | Magenta | Yellow | Black |  |
| Embodiment 1 | A | B | A | — | B |
| Embodiment 2 | A | B | B | — | B |
| Embodiment 3 | A | A | A | — | A |
| Embodiment 4 | A | B | A | — | B |
| Embodiment 5 | A | A | B | A | B |
| Embodiment 6 | A | A | A | A | A |
| Embodiment 7 | A | B | A | A | B |
| Comparative Example 1 | A | A | B | — | B |
| Comparative Example 2 | A | B | A | — | B |
| Comparative Example 3 | A | A | A | — | A |
| Comparative Example 4 | A | B | B | — | B |
| Comparative Example 5 | A | F | A | — | F |
| Comparative Example 6 | A | E | A | — | E |
| Comparative Example 7 | A | A | B | C | C |
| Comparative Example 8 | A | A | B | A | B |

Furthermore, the following bronzing evaluation and humidityfastness evaluation were performed.

Bronzing Evaluation

Fill printing using each ink was performed for the ink set of Embodiments 1 through 7 so that the amount of ink used was between 1.5 and 2.2 mg per square inch on inkjet special recording media (photographic paper (glossy): product number KA420PSK; product name, manufactured by Seiko Epson Corp.), and the printed matter obtained was measured using a gloss meter (PG-1M, manufactured by Nippon Denshoku) to determine the gloss (measurement angle 60°). The printing was performed at 27° C. and 65% RH. The criteria was determined by estimating the occurrence of bronzing by the calculated increase based on the degree of gloss obtained and the following equation, and the judgment was made based on the following judgment criteria.

Increase = degree of gloss (printed matter) − degree of gloss (recording medium)

Judgment Criteria

Rank A: Less than 15

Rank B: 15 or higher and less than 35

Rank C: 35 or higher and less than 55

Rank D: 55 or higher

The results obtained are shown in Table 10 as "bronzing resistance".

TABLE 10

|  | Bronzing Propriety of Individual Colors | | | | Bronzing Property of Ink Set |
|---|---|---|---|---|---|
|  | Cyan | Magenta | Yellow | Black |  |
| Embodiment 1 | B | A | A | — | B |
| Embodiment 2 | A | A | A | — | A |
| Embodiment 3 | B | A | A | — | B |
| Embodiment 4 | A | A | A | — | A |
| Embodiment 5 | B | A | A | A | B |
| Embodiment 6 | A | A | A | A | A |
| Embodiment 7 | A | A | A | A | A |

Evaluation of Reflected Light Intensity of Black Ink and Various Media

Monochrome printing was performed while changing the weight of printing ink for each of the black inks in the ink set of embodiments 5 to 7 using inkjet special recording media "photographic paper (glossy): product number KA420PSK; product name, manufactured by Seiko Epson Corp.", as well as "photomatte paper: product number KA420PM; product name, manufactured by Seiko Epson Corp." and normal paper "Xerox-4024; product name, manufactured by Xerox Corp." The reflected light intensity of the printed matter was measured using an intensity meter (Spectrolino (registered trademark), manufactured by Gretag Corp.) The measurement conditions were a light source of D50, and a viewing angle of 2° with no filter. The maximum value for the reflected light intensity was determined. The results obtained are shown in Table 11 as the Evaluation of Reflected Light Intensity of Black Ink and Various Media.

TABLE 11

Maximum Reflective Optical Intensity of Various Black Inks on Different Media

| | Photographic paper (glossy) | Photomatte paper | Xerox-4024 |
|---|---|---|---|
| Embodiment 5 | 2.45 | 1.75 | 1.25 |
| Embodiment 6 | 2.45 | 1.75 | 1.25 |
| Embodiment 7 | 2.45 | 1.65 | 1.2 |

The results obtained for the 3 types and 5 items of evaluation, namely ozonefastness, lightfastness, and humidityfastness are shown again in Table 12 and a ranking of the overall characteristics was made.

TABLE 12

| | Ozonefastness of Ink Set | | Lightfastness of Ink Set | | | |
|---|---|---|---|---|---|---|
| | Ozonefast-ness | Color Balance | Lightfast-ness | Color Balance | Humidityfastness of Ink Set | Overall |
| Embodiment 1 | C | C | C | C | B | B |
| Embodiment 2 | C | B | C | C | B | B |
| Embodiment 3 | B | A | B | B | A | A |
| Embodiment 4 | B | B | B | B | B | B |
| Embodiment 5 | C | B | C | C | A | B |
| Embodiment 6 | B | A | B | B | A | A |
| Embodiment 7 | B | B | A | A | B | A |
| Comparative Example 1 | F | F | F | F | A | E |
| Comparative Example 2 | F | F | C | C | B | D |
| Comparative Example 3 | F | F | F | F | A | E |
| Comparative Example 4 | C | C | E | C | B | C |
| Comparative Example 5 | C | C | B | B | F | C |
| Comparative Example 6 | D | D | E | E | E | D |
| Comparative Example 7 | F | F | F | F | C | E |
| Comparative Example 8 | F | F | E | E | A | D |

A ranking of A through F was made for the overall evaluation, and a rank of A was most superior, followed by a superior rank of B. Furthermore, a rank of F indicated the worst characteristics.

The present invention has a possibility of industrial application as an ink set that can record an image with excellent lightfastness, ozonefastness, and humidityfastness on a recording medium, as well as an ink cartridge, inkjet recording method, and recorded matter.

What is claimed is:

1. An ink set comprising at least a yellow ink composition, a magenta ink composition, and a cyan ink composition: said magenta ink composition containing as a colorant at least one type of compound expressed by the following formula M-1, and at least one type of compound expressed by the following formula M-2

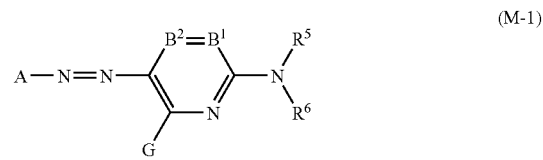

(M-1)

wherein in Formula M-1, A represents a residue of a five membered heterocyclic diazo component A-NH$_2$; B$^1$ and B$^2$ each represent —CR$^1$═ or —CR$^2$═, or either one represents a nitrogen atom while the other represents either —CR$^1$═ or —CR$^2$═; R$^5$ and R$^6$ each independently represent a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group, or a sulfamoyl group; each group may also have a substitution group; G, R$^1$, and R$^2$ each independently represent a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocycloxy group, an alkoxycarbonyloxy group, an aryloxycarbonyloxy group, an amino group substituted with an alkyl group, aryl group, or heterocyclic group, an acylamino group, a ureido group, a sulfamoylamino group, alkoxycarbonylamino group, an aryloxycarbonylamino group, an alkyl or arylsulfonylamino group, an aryloxycarbonylamino group, a nitro group, an alkyl or arylthio group, an alkyl or arylsulfonyl group, an alkyl or arylsulfinyl group, a sulfamoyl group, a sulfo group, or a heterocyclothio group; each group may also have a substitution group; and furthermore, $R^1$ and $R^5$ or $R^5$ and $R^6$ bonded together can form a 5 or 6 membered ring

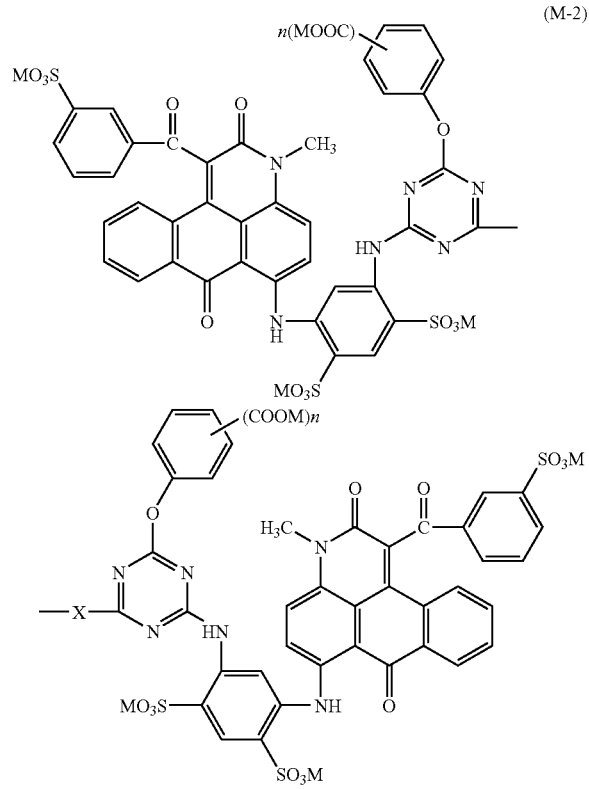

(M-2)

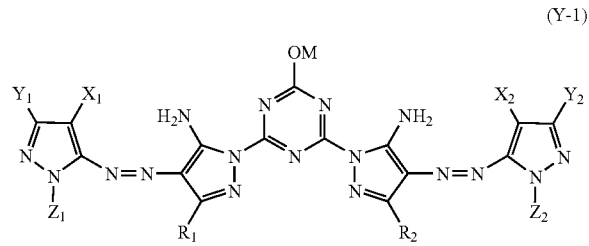

wherein in Formula M-2, M represents a hydrogen atom, ammonium group, or alkali metal atom, X represents a diaminoalkylene group, and n is either 1 or 2;

the yellow ink composition containing as a colorant at least one type of compound expressed by the following formula Y-1

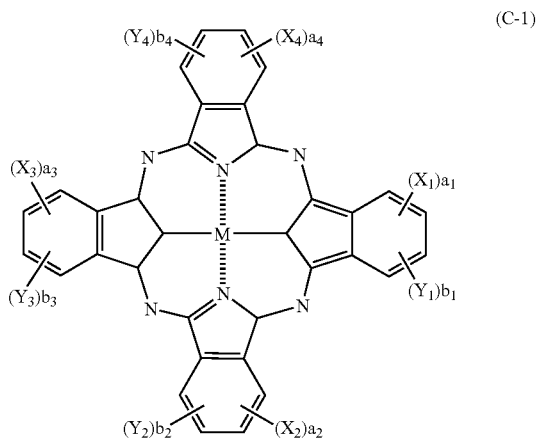

(Y-1)

wherein in Formula Y-1, $X_1$, $X_2$, $Y_1$, and $Y_2$ represent a hydrogen atom or a cyano group, $Z_1$ and $Z_2$ represent a substitution group with an aromatic ring, $R_1$ and $R_2$ represent an alkyl group, and M is a metal atom); and the cyan ink composition containing as a colorant at least one type of compound selected from the group consisting of compounds or salts thereof expressed by the following Formula C-1

(C-1)

wherein in Formula C-1, $X_1$, $X_2$, $X_3$, and $X_4$ independently represent either —SO—Z or —SO$_2$—Z; wherein Z independently represents a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group;

$Y_1$, $Y_2$, $Y_3$, and $Y_4$ independently represent a hydrogen atom, a halogen atom, an alkyl group, a cycloalkyl group, an alkenyl group, an aralkyl group, an aryl group, a heterocyclic group, a cyano group, an hydroxyl group, a nitro group, an amino group, an alkylamino group, an alkoxy group, an aryloxy group, an amido group, an arylamino group, an ureido group, a sulfamoylamino group, an alkylthio group, an arylthio group, an alkoxycarbonylamino group, a sulfonamide group, a carbamoyl group, an alkoxycarbonyl group, a heterocycloxy group, an azo group, an acyloxy group, a carbamoyloxy group, a silyloxy group, an aryloxycalbonyl group, an aryloxycalbonylamino group, an imido group, a heterocyclothio group, a phospholyl group, an acyl group, or an ionic hydrophilic group, and each of the groups may also have substitution groups;

$a_1$ through $a_4$ and $b_1$ through $b_4$ represent the number of substitution groups of $X_1$ through $X_4$ and $Y_1$ through $Y_4$; furthermore $a_1$ through $a_4$ are independently integers between 0 and 4, but are not all simultaneously 0; $b_1$ through $b_4$ are independently integers between 0 and 4;

M represents a hydrogen atom, a metal atom or oxide thereof, a hydroxide, or a halide;

with the proviso that at least one of $X_1$, $X_2$, $X_3$, $X_4$, $Y_1$, $Y_2$, $Y_3$, and $Y_4$ is an ionic hydrophilic group or a group which has an ionic hydrophilic group as a substitution group.

2. The ink set according to claim 1, wherein the compound expressed by Formula M-1 which is a colorant included in the magenta ink composition is a compound expressed by Formula M-3

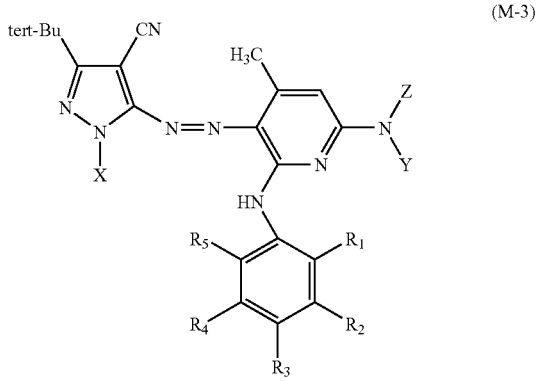

(M-3)

wherein in Formula M-3, $R_1$ through $R_5$ represent a hydrogen atom, alkyl group, sulfo group, or salt thereof, and when $R_1$ and $R_5$ are independently both alkyl groups, the total number of carbons in the alkyl groups is 3 or more, and substitution groups may also be present; X represents a hydrogen atom, an aliphatic group, an aromatic group, or a heterocyclic group, and Y and Z each independently represent a hydrogen atom, and an aliphatic group, an aromatic group, a heterocyclic group, an acyl group, an alkyloxycarbonyl group, an aryloxycarbonyl group, a carbamoyl group, an alkylsulfonyl group, an arylsulfonyl group, or a sulfamoyl group; each group may also have a substitution group.

3. The ink set according to claim 2, wherein the compound expressed by Formula M-3 is a compound expressed by Formula M-4

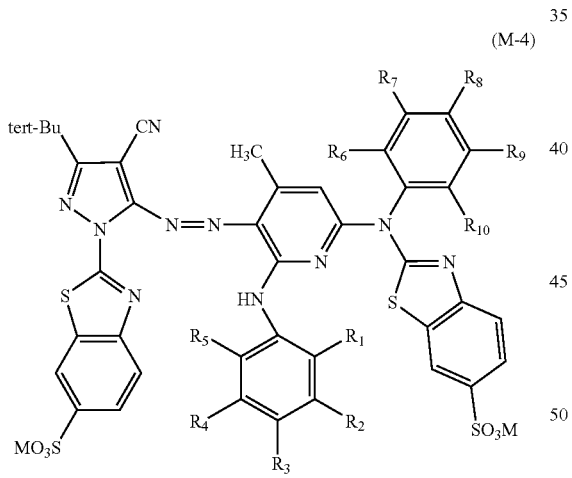

(M-4)

wherein in Formula M-4, $R_1$ through $R_{10}$ represent a hydrogen atom, alkyl group, sulfo group, or salt thereof, and when ($R_1$ and $R_5$) or ($R_6$ and $R_{10}$) are independently both alkyl groups, the total number of carbons in the alkyl groups is 3 or more, and substitution groups may also be present; furthermore, M represents a hydrogen atom or an alkali metal atom.

4. The ink set according to claim 1, wherein said n represents 2 in the compound expressed by said Formula M-2 which is a colorant contained in said magenta ink composition.

5. The ink set according to claim 1, containing between 0.2 and 2.5 wt % of at least one type of compound expressed by Formula M-1, and between 0.4 and 7.0 wt % of at least one type of compound expressed by Formula M-2, based on the total weight of the magenta ink composition.

6. The ink set according to claim 1, wherein the content weight ratio of the compound expressed by Formula M-1 and the compound expressed by Formula M-2 in the magenta ink composition is in a range between 2:1 and 1:8.

7. The ink set according to claim 1, containing a betain type surfactant expressed by the following Formula b-1 in the magenta ink composition

(b-1)

wherein in Formula b-1, R represents a hydrogen atom, an alkyl group, an aryl group, or a heterocyclic group; L represents a bonding group with a valence of two or higher; M represents a hydrogen atom, an alkali metal atom, an ammonium group, a protonated organic amine or nitrogen containing heterocyclic group, or a quaternary ammonium ion group, and represents a group that does not exist as a cation if M can be a counter ion for the ammonium ion comprising the nitrogen atom shown in Formula b-1; q represents an integer 1 or greater, and r represents an integer between 1 and 4; p represents an integer between 0 and 4, and p+r is either 3 or 4; if p+r is 4, N represents a nitrogen atom that forms a quaternary amine; if p is 2 or higher, R may be the same or may be different; if q is 2 or higher, COOM may be the same or may be different; and if r is 2 or higher, L-(COOM)$_q$ may be the same or may be different.

8. The ink set according to claim 7, wherein the betaine surfactant expressed by Formula b-1 is a compound expressed by Formula b-2

(b-2)

wherein in Formula b-2, $R_1$ through $R_3$ represent alkyl groups with between 1 and 20 carbons, and X represents a bonding group with a valence of 2.

9. The ink set according to claim 8, wherein the compound expressed by Formula b-2 is a compound expressed by Formula b-3

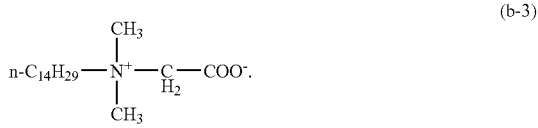

(b-3)

10. The ink set according to claim 7, wherein the content weight ratio of the compound expressed by Formula M-1 and the betaine surfactant expressed by Formula b-2 in the magenta ink composition is in a range between 1:3 and 3:1.

11. The ink set according to claim 1, wherein the compound expressed by Formula Y-1 which is contained in the yellow ink composition as a colorant is a compound expressed by the following Formula Y-2

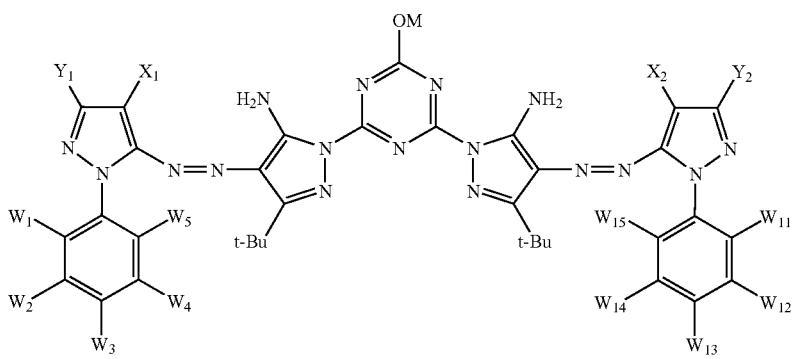

(Y-2)

wherein in Formula Y-2, $X_1$, $X_2$, $Y_1$, and $Y_2$ represent a hydrogen atom or a cyano group, $W_1$ through $W_5$ and $W_{11}$ through $W_{15}$ each represent a hydrogen atom, or a carboxyl group or salt thereof, M represents a metal atom, and t-Bu represent a tertiary butyl group.

12. The ink set according to claim 1, wherein the yellow ink composition includes as a colorant at least one type of compound expressed by the following Formula Y-3

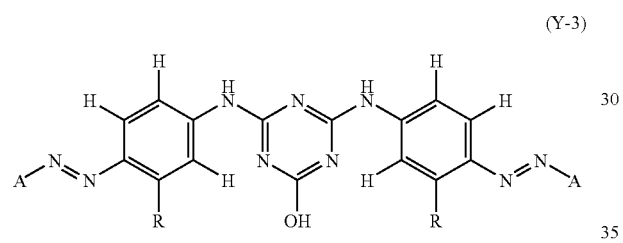

(Y-3)

wherein in Formula Y-3, R represents a methoxy group or a methyl group, and A represents 1,5-disulfonaphtho-3-yl or 1,5,7-trisulfonaphtho-2-yl.

13. The ink set according to claim 1, wherein in the compound expressed by Formula C-1 that is contained as the cyan dye in the cyan ink composition, M represents a copper atom, $X_1$, $X_2$, $X_3$, and $X_4$ represent —$SO_2Z$, Z represents $R^5$ wherein $R^5$ represents —$(CH_2)_3SO_3M^2$ where $M^2$ represents an alkali metal atom) or $R^6$ wherein $R^6$ represents —$(CH_2)_3SO_2NHCH_2CH(OH)CH_3$, $Y_1$, $Y_2$, $Y_3$, and $Y_4$ are hydrogen atoms, $a_1$, $a_2$, $a_3$, and $a_4$ are either 0 or 1, two or more of $a_1$, $a_2$, $a_3$ and $a_4$ are 1, and $b_1$, $b_2$, $b_3$, and $b_4$ are integers such that the sum of each of them with the corresponding $a_1$, $a_2$, $a_3$, and $a_4$ is 4.

14. The ink set according to claim 13, wherein $M^2$ represents lithium.

15. The ink set according to claim 13, wherein for the cyan dye, Z in the compound expressed by Formula C-1 independently represents a blend consisting of tetrasulfonates, trisulfonates, and disulfonates selected from $R^5$ or $R^6$, and the molar ratio of $R^5$ and $R^6$ contained in the overall cyan dye is $R^5/R^6=3/1$.

16. The ink set according to claim 1, wherein the cyan ink composition contains at least one type of compound selected from the group consisting of naphthalene based aromatic compounds or salts thereof having a carboxyl group in the second position.

17. The ink set according to claim 16, wherein the salt of the naphthalene based aromatic compound having a carboxyl group in the second position is a lithium salt.

18. The ink set according to claim 1, further comprising a black ink composition.

19. The ink set according to claim 18, wherein the black ink composition contains a colorant expressed by the following Formula Bk-1

$$A_1\text{-}N=N\text{-}A_2\text{-}N=N\text{-}A_3 \qquad (Bk\text{-}1)$$

wherein in Formula Bk-1, $A_1$ is a substitution group expressed by Formula Bk-2 or Bk-3, $A_2$ is a substitution group expressed by Bk-4 or Bk-5, and $A_3$ is a substitution group expressed by Bk-6)

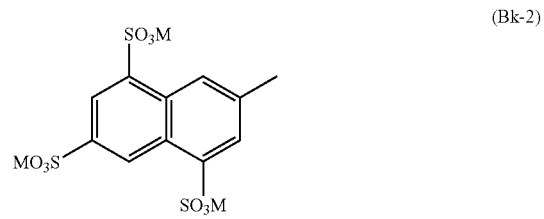

(Bk-2)

wherein in Formula Bk-2, M represents either lithium or sodium;

(Bk-3)

wherein in Formula Bk-3, M represents either lithium or sodium;

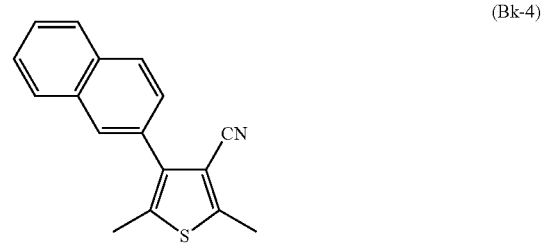

(Bk-4)

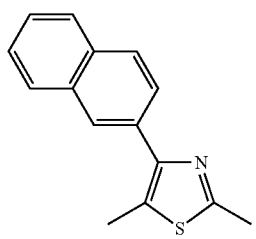
(Bk-5)

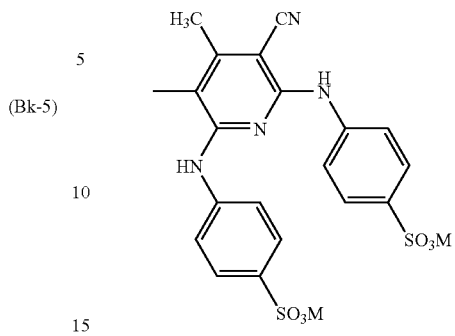
(Bk-6)

wherein in Formula Bk-6, M represents either lithium or sodium.

20. The ink set according to claim 18, wherein the black ink composition further contains a colorant expressed by the following Formula Bk-7

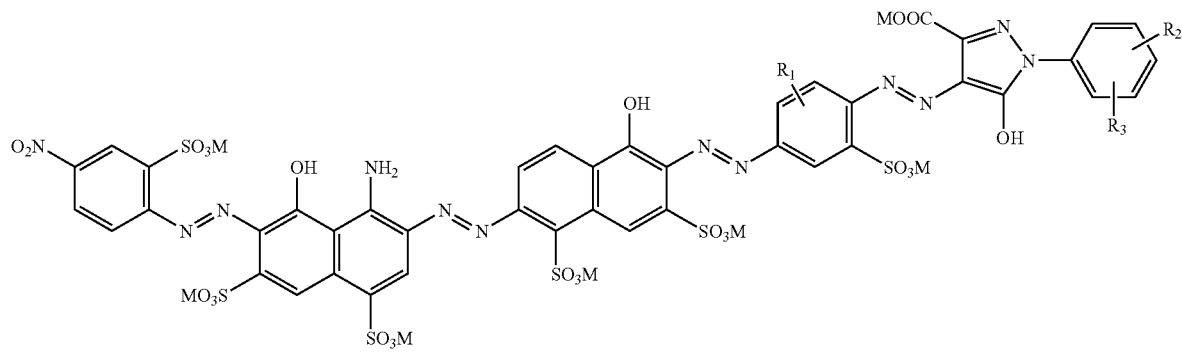
(Bk-7)

wherein in Formula Bk-7, $R_1$ represents a halogen atom, H, $SO_3M$, or COOM, $R_2$ and $R_3$ independently represent H, $SO_3M$, or COOM, and M represents either lithium or sodium; however, $R_2$ and $R_3$ are not both H.

21. The ink set according to claim 18, wherein the formulation ratio of the colorant expressed by Formula Bk-1 and the colorant expressed by Formula Bk-7 in the black ink composition is between 2:1 and 1:2.

22. The ink set according to claim 18, wherein the black ink composition further contains a colorant expressed by the following Formula Adj-1

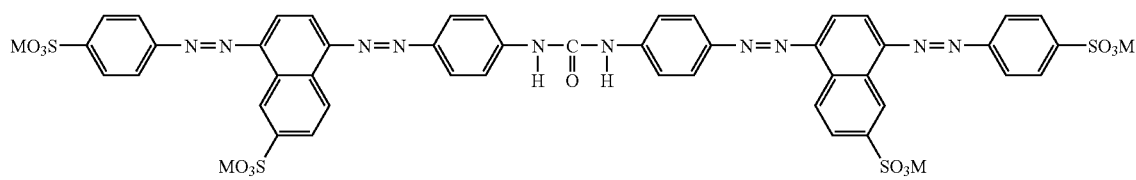
(Adj-1)

wherein in Formula Adj-1, M represents either lithium or sodium.

23. The ink set according to claim 22, wherein the colorant expressed by Formula Adj-1 is a colorant expressed by the following Formula Adj-1-1

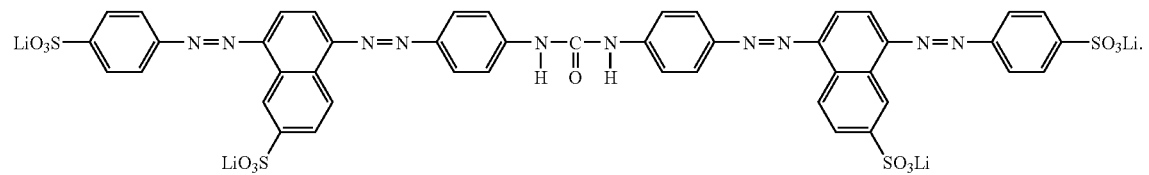
(Adj-1-1)
24. The ink set according to claim 18, wherein the black ink composition further contains C. I. Direct Yellow 86 as a colorant.
* * * * *